United States Patent
Sangare et al.

(10) Patent No.: US 10,379,541 B2
(45) Date of Patent: Aug. 13, 2019

(54) MOBILE UNIT CONTROL DEVICE AND MOBILE UNIT

(71) Applicant: Nidec Corporation, Kyoto (JP)

(72) Inventors: Ousmane Monzon Sangare, Kyoto (JP); Masahiro Akamatsu, Nagaokakyo (JP); Masayuki Otani, Nagaokakyo (JP)

(73) Assignee: NIDEC CORPORATION, Kyoto (JP)

( * ) Notice: Subject to any disclaimer, the term of this patent is extended or adjusted under 35 U.S.C. 154(b) by 137 days.

(21) Appl. No.: 15/509,302

(22) PCT Filed: Aug. 27, 2015

(86) PCT No.: PCT/JP2015/074210
§ 371 (c)(1),
(2) Date: Mar. 7, 2017

(87) PCT Pub. No.: WO2016/039158
PCT Pub. Date: Mar. 17, 2016

(65) Prior Publication Data
US 2018/0231983 A1    Aug. 16, 2018

(30) Foreign Application Priority Data

Sep. 8, 2014 (JP) .................................. 2014-181853

(51) Int. Cl.
*G05D 1/02* (2006.01)
*G06K 9/00* (2006.01)
*G05D 1/00* (2006.01)
*G01S 11/12* (2006.01)
*G01S 3/786* (2006.01)

(52) U.S. Cl.
CPC ............ *G05D 1/0246* (2013.01); *G01S 11/12* (2013.01); *G06K 9/00369* (2013.01); *G06K 9/00664* (2013.01); *G01S 3/7864* (2013.01); *G05D 1/0088* (2013.01)

(58) Field of Classification Search
CPC ............... G05D 1/0246; G05D 1/0088; G06K 9/00664; G06K 9/00369; G01S 3/7864
USPC ................................................. 700/245, 259
See application file for complete search history.

(56) References Cited

U.S. PATENT DOCUMENTS

| 6,904,334 B2 | 6/2005 | Asano et al. |
| 7,551,980 B2 | 6/2009 | Sakagami et al. |

(Continued)

FOREIGN PATENT DOCUMENTS

| JP | 03-6710 A | 1/1991 |
| JP | 2003-052039 A | 2/2003 |

(Continued)

*Primary Examiner* — Jaime Figueroa
(74) *Attorney, Agent, or Firm* — Keating & Bennett, LLP

(57) ABSTRACT

A mobile unit control device includes an imaging unit, an identification unit, and a control unit. When installed on a mobile unit, the imaging unit captures at least a portion of the surroundings of the mobile unit to obtain an image thereof. When the image captured by the imaging unit includes a figure of a person, the identification unit determines a trunk of the person in the figure of the person as a representative point. The control unit controls a movement of the mobile unit on the basis of the position of the representative point determined by the identification unit in the image.

8 Claims, 12 Drawing Sheets

(56) References Cited

U.S. PATENT DOCUMENTS

| | | | |
|---|---|---|---|
| 8,180,104 B2* | 5/2012 | Sonoura | G01S 5/0294 |
| | | | 382/103 |
| 9,743,014 B2* | 8/2017 | Tate | H04N 5/247 |
| 2004/0015265 A1 | 1/2004 | Asano et al. | |
| 2004/0199292 A1 | 10/2004 | Sakagami et al. | |
| 2007/0222566 A1 | 9/2007 | Tsuji et al. | |
| 2008/0193009 A1* | 8/2008 | Sonoura | G01S 5/0294 |
| | | | 382/153 |
| 2011/0060248 A1 | 3/2011 | Ishida et al. | |
| 2011/0234854 A1 | 9/2011 | Kimura | |
| 2013/0342652 A1 | 12/2013 | Kikkeri et al. | |
| 2015/0363636 A1* | 12/2015 | Tate | H04N 5/247 |
| | | | 382/103 |
| 2016/0335861 A1* | 11/2016 | Shimura | G08B 13/19613 |

FOREIGN PATENT DOCUMENTS

| | | |
|---|---|---|
| JP | 2004-126802 A | 4/2004 |
| JP | 2006-155349 A | 6/2006 |
| JP | 2007-206041 A | 8/2007 |
| JP | 2007-229816 A | 9/2007 |
| JP | 2007-265343 A | 10/2007 |
| JP | 4245887 B2 | 4/2009 |
| JP | 2010-172548 A | 8/2010 |
| JP | 5084756 B2 | 11/2012 |

\* cited by examiner

MOBILE UNIT CONTROL DEVICE AND MOBILE UNIT

BACKGROUND OF THE INVENTION

1. Field of the Invention

The present invention relates to a mobile unit control device and a mobile unit.

2. Description of the Related Art

A tracking method of detecting the position of a specific tracking target object and tracking the tracking target object while keeping a distance therefrom has been proposed.

In a tracking method described in Japanese Patent Application Laid-Open Publication: JP-A 2006-155349, for example, a tracking target object is provided with a first position detection sensor and first information communication means, and the tracking target object includes storage means for storing position detection information obtained by the first position detection sensor together with time information from timepiece means. In this tracking method, a tracking device is provided with a second position detection sensor and second information communication means, and the tracking device tracks the tracking target object by reproducing a path along which the tracking target object traveled in the past on the basis of information stored in the storage means.

SUMMARY OF THE INVENTION

Problems to be Solved by the Invention

However, a person performs more complicated motions than a mobile unit (e.g., a vehicle, a truck, etc.) that moves with rotation of wheels. To acquire information as to a movement of a person, use of various sensors and real-time complicated computations using pieces of information detected by the respective sensors are required, and therefore, a large number of parts and a large computation amount are required. The tracking method described in Japanese Patent Application Laid-Open Publication: JP-A 2006-155349 requires a tracking target person to be equipped with the first position detection sensor and the first information communication means.

The present invention has been conceived in view of the above circumstances, and provides a mobile unit control device and a mobile unit which are able to follow a person with a simple structure.

Solution to the Problems (1) The present invention has been conceived to solve the above-described problems, and one preferred embodiment of the present invention is a mobile unit control device including an imaging unit that, when installed on a mobile unit, captures at least a portion of surroundings of the mobile unit to obtain an image thereof; an identification unit that, when the image captured by the imaging unit includes a figure of a person, determines a trunk of the person in the figure of the person as a representative point; and a control unit that controls a movement of the mobile unit on a basis of a position of the representative point determined by the identification unit in the image.

(2) One preferred embodiment of the present invention is the above-described mobile unit control device, in which the identification unit extracts the representative point from each of a plurality of images captured by the imaging unit in sequence, and the control unit controls the movement of the mobile unit on a basis of a change over time in the position of the representative point extracted by the identification unit.

(3) One preferred embodiment of the present invention is the above-described mobile unit control device, in which the movement includes a moving direction of the mobile unit, and the control unit changes an orientation of the mobile unit when the identification unit is unable to determine the representative point.

(4) One preferred embodiment of the present invention is the above-described mobile unit control device, in which, if the identification unit determines that the image captured by the imaging unit includes a figure of a person in a predetermined posture, the control unit starts controlling the movement of the mobile unit on the basis of the representative point of this person.

(5) One preferred embodiment of the present invention is the above-described mobile unit control device, in which the control unit outputs a notification to urge any person to assume the predetermined posture when the identification unit is unable to determine the representative point.

(6) One preferred embodiment of the present invention is the above-described mobile unit control device, in which the control unit controls the movement of the mobile unit so that a distance between the representative point and a reference point of the mobile unit will be equal to a predetermined distance.

(7) One preferred embodiment of the present invention is a mobile unit including the above-described mobile unit control device, and capable of moving in an arbitrary direction along a ground.

(8) One preferred embodiment of the present invention is the above-described mobile unit, the mobile unit being an automated guided vehicle.

Advantages of the Invention

According to one preferred embodiment of the present invention, a mobile unit is able to follow a person with a simple structure.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Hereinafter, a first preferred embodiment of the present invention will be described with reference to the accompanying drawings.

Figure 1:
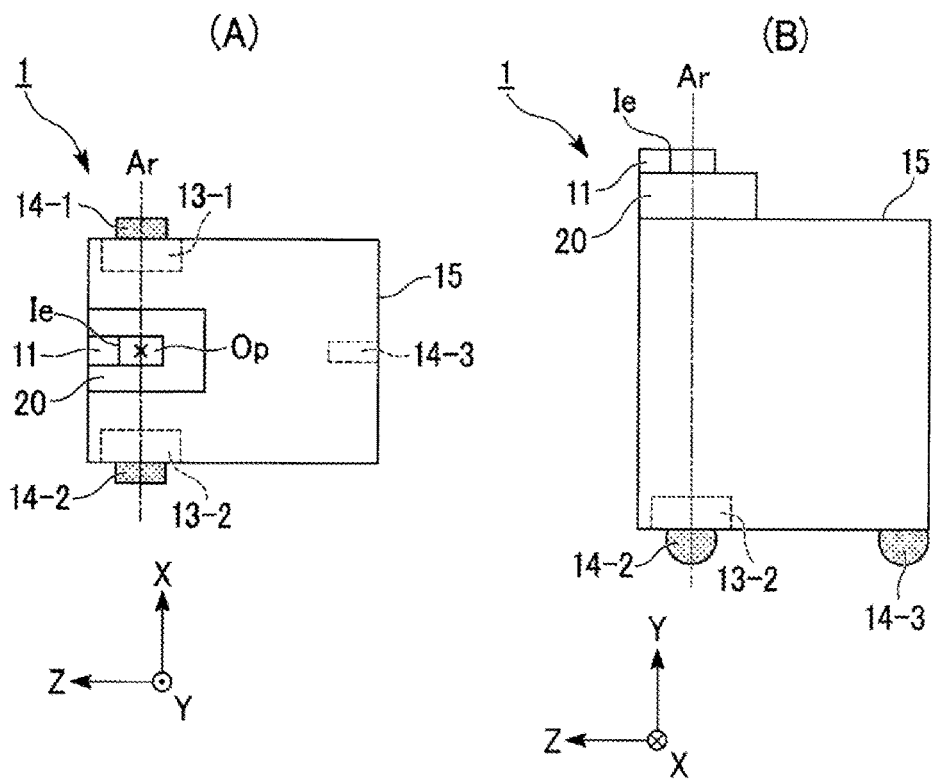
FIG. 1 shows schematic diagrams illustrating the structure of a mobile unit according to a first preferred embodiment of the present invention.

FIG. 1 shows schematic diagrams illustrating the structure of a mobile unit 1 according to the present preferred embodiment. In FIG. 1, X, Y, and Z represent an x-axis, a y-axis, and a z-axis, respectively, of a three-dimensional orthogonal coordinate system. FIGS. 1A and 1B are a plan view and a side view, respectively, of the mobile unit 1.

The mobile unit 1 includes driving units 13-1 and 13-2, wheels 14-1, 14-2, and 14-3, and a base 15. The mobile unit 1 is, for example, an automated guided vehicle. With the above structure, the automated guided vehicle is able to follow a person with a simple structure.

The driving units 13-1 and 13-2 are arranged to rotate the wheels 14-1 and 14-2, respectively. The wheels 14-1, 14-2, and 14-3 support a bottom surface of the base 15 and rotate to move the mobile unit 1 as a whole. The wheel 14-3 is arranged at a position close to a midpoint of one side of the bottom surface, while the wheels 14-1 and 14-2 are arranged at positions adjacent to a side opposite to the above one side, and adjacent to both side surfaces of the base 15. An axis Ar is a straight line passing through centers of rotation of both the wheels 14-1 and 14-2. In the following description, a direction leading from the wheel 14-3 to a midpoint between the wheels 14-1 and 14-2 will be referred to as a forward direction, while a direction leading from the midpoint between the wheels 14-1 and 14-2 to the wheel 14-3 will be referred to as a backward direction. A left side and a right side as viewed in the forward direction will be referred to simply as a left side and a right side, respectively.

A rotation sensor (not shown) is attached to an axle (not shown) of each of the wheels 14-1 and 14-2. The rotation sensors measure rotation speeds of the respective wheels 14-1 and 14-2, and output rotation signals representing the measured rotation speeds to the driving units 13-1 and 13-2. The driving units 13-1 and 13-2 calculate rotation amounts of the wheels 14-1 and 14-2, respectively, on the basis of the rotation speeds represented by the rotation signals received from the rotation sensors. The driving units 13-1 and 13-2 control the rotation of the wheels 14-1 and 14-2 with the rotation amount and a driving amount inputted from a mobile unit control device 20 as a control amount and a control target amount, respectively. The driving units 13-1 and 13-2 employ, for example, proportional-integral-derivative (PID) control in the control of the rotation of the wheels 14-1 and 14-2.

An imaging unit 11 and the mobile unit control device 20 are installed on the base 15. One or both of the imaging unit 11 and the mobile unit control device 20 may be detachable from the base 15.

In the example illustrated in FIG. 1, an optical axis of the imaging unit 11 is oriented in the forward direction. An optical center of the imaging unit 11 coincides with a midpoint between the centers of rotation of the wheels 14-1 and 14-2 on the axis Ar in a plan view. In the following description, the optical center of the imaging unit 11 will be referred to as a reference point Op. The reference point Op is a point representing the position of the mobile unit 1.

The imaging unit 11 captures images of a subject within a predetermined field of vision with the direction of the optical axis as a center at intervals of a predetermined time (e.g., 30 ms). That is, the imaging unit 11 captures a portion of the surroundings of the mobile unit 1 to obtain an image thereof. The imaging unit 11 captures an image of the subject formed on an imaging surface Ie. The imaging unit 11 is, for example, a range image sensor, a stereo camera, or the like. Image data representing the image obtained by the imaging unit 11 is a depth map. The depth map is data containing a depth value for each of a plurality of sets of two-dimensional coordinates included in an area of a one-frame image. In other words, the depth map is data representing a three-dimensional shape of a surface of the subject with the depth values of the plurality of sets of two-dimensional coordinates. The depth map is referred to also as a range image. The depth map is generated by, for example, the range image sensor and the image captured by the imaging unit 11. Note that the depth map may alternatively be generated from two images captured by the stereo camera. The imaging unit 11 outputs the image data representing the obtained image to the mobile unit control device 20.

Next, the two-dimensional coordinates included in the area of the image and the depth value will be described with reference to FIG. 2. In the following description, the two-dimensional coordinates included in the area of the image will sometimes be referred to as intra-image coordinates.

Figure 2:
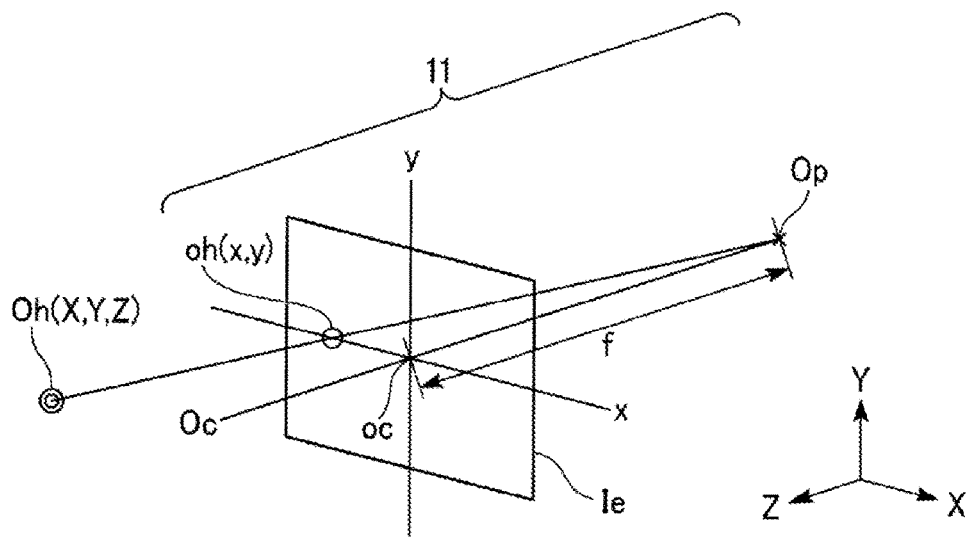
FIG. 2 is a diagram for explaining image data and a coordinate system.

FIG. 2 is a diagram for explaining a relationship between the intra-image coordinates and the depth value. In the example illustrated in FIG. 2, the direction Oc of the optical axis of the imaging unit 11 is oriented in a Z direction.

In the imaging unit 11, the imaging surface Ie is arranged at a position forwardly away from the reference point Op by a predetermined focal length f. The direction of a normal to the imaging surface Ie is oriented in the direction Oc of the optical axis. The optical axis, which passes through the reference point Op, intersects the imaging surface Ie at a center oc of the imaging surface Ie. Intra-image coordinates (x, y) represent the position of one of a plurality of pixels arrayed in the imaging surface Ie. The intra-image coordinates (x, y) are expressed in a two-dimensional coordinate system with the center oc at the origin. Here, x and y represent a horizontal coordinate value and a vertical coordinate value, respectively.

Assume here that three-dimensional coordinates (X, Y, Z) representing the position of a representative point Oh of a certain subject are given. An image representing the representative point Oh is formed at a point oh of intersection of the imaging surface Ie with a straight line passing through the reference point Op and the representative point Oh. The depth map has a Z-direction coordinate value of the representative point Oh as a depth value Z for the intra-image coordinates (x, y) of the point oh of intersection. Here, an X-direction coordinate value X and a Y-direction coordinate value Y of the representative point Oh are expressed by Eq. (1) using the depth value Z and the intra-image coordinates (x, y). Therefore, in the depth map, the three-dimensional coordinates (X, Y, Z) of the representative point Oh are determined by specifying the intra-image coordinates (x, y).

$$X=x \cdot Z/f, \ Y=y \cdot Z/f \quad (1)$$

The mobile unit control device 20 detects a figure of a person represented by the image data outputted by the imaging unit 11. The mobile unit control device 20 determines a trunk of the person in the detected figure of the person as the representative point. The mobile unit control device 20 controls the rotation of the wheels 14-1 and 14-2 by the driving units 13-1 and 13-2 on the basis of the determined representative point. With this control, the movement of the mobile unit 1 is controlled.

(Structure of Mobile Unit Control Device)

Next, the structure of the mobile unit control device 20 according to the present preferred embodiment will be described.

Figure 3:
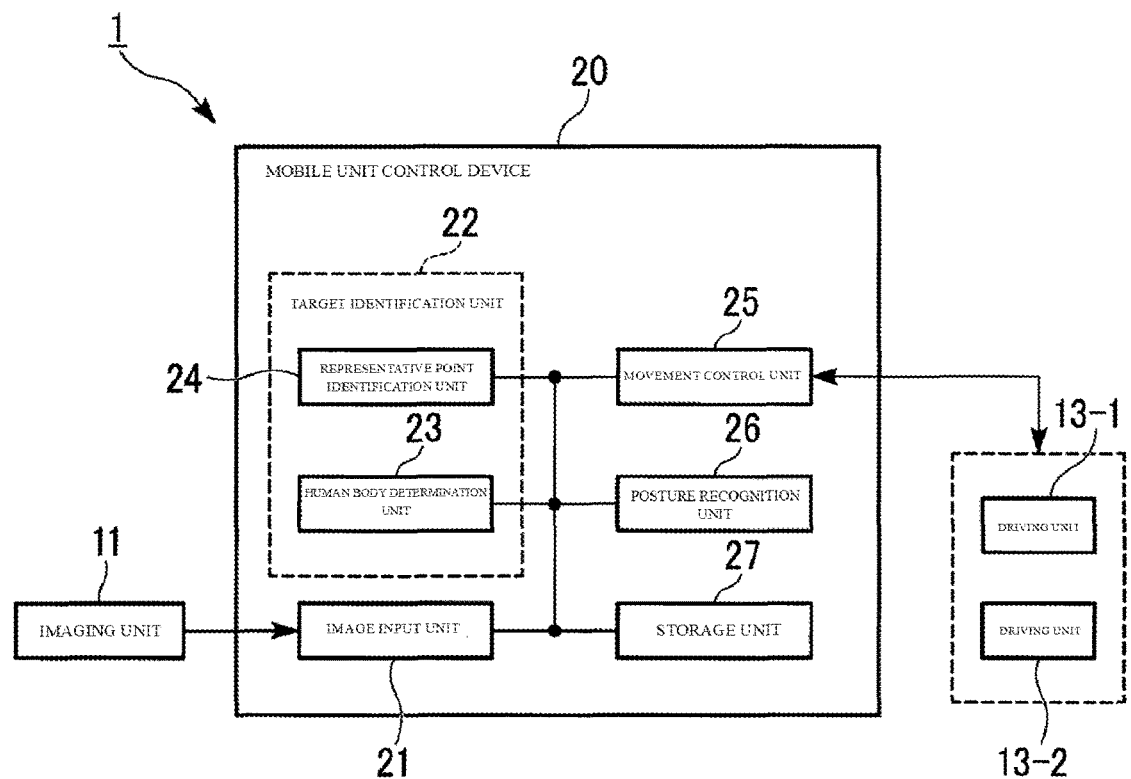
FIG. 3 is a block diagram illustrating the structure of a mobile unit control device according to the first preferred embodiment of the present invention.

FIG. 3 is a block diagram illustrating the structure of the mobile unit control device 20 according to the present preferred embodiment.

The mobile unit control device 20 includes an image input unit 21, a target identification unit 22, a movement control unit 25, a posture recognition unit 26, and a storage unit 27. The mobile unit control device 20 may further include the imaging unit 11.

The image input unit 21 stores the image data inputted from the imaging unit 11 in the storage unit 27 sequentially. The image input unit 21 is, for example, a data input/output interface.

The target identification unit 22 includes a human body determination unit 23 and a representative point identification unit 24.

The human body determination unit 23 reads the image data sequentially stored in the storage unit 27 to detect a figure of a person from the read image data. The human body determination unit 23, for example, refers to the image data and extracts a contour of the figure on the basis of differences in the depth value between sets of coordinates in proximity to each other. The human body determination unit 23 compares the extracted contour with a human body model to detect a figure of a person. The human body determination unit 23 stores contour data representing the extracted contour in the storage unit 27.

The human body model is data representing sets of intra-image coordinates (x, y) of a plurality of nodal points, and a plurality of sides. Each nodal point is a point representing the position of a portion of a human body or the position of a midpoint between portions of the human body. Examples of the nodal points include a point representing the position of a head, and a point representing a joint between an upper arm and a forearm. The nodal point is referred to also as a joint or a node. Each side is information representing a connection between two of the nodal points. The sides indicate whether or not portions are connected to each other. The side is referred to also as a link. Accordingly, the human body model expresses a posture of the human body. Next, an example human body model will be described.

Figure 4:
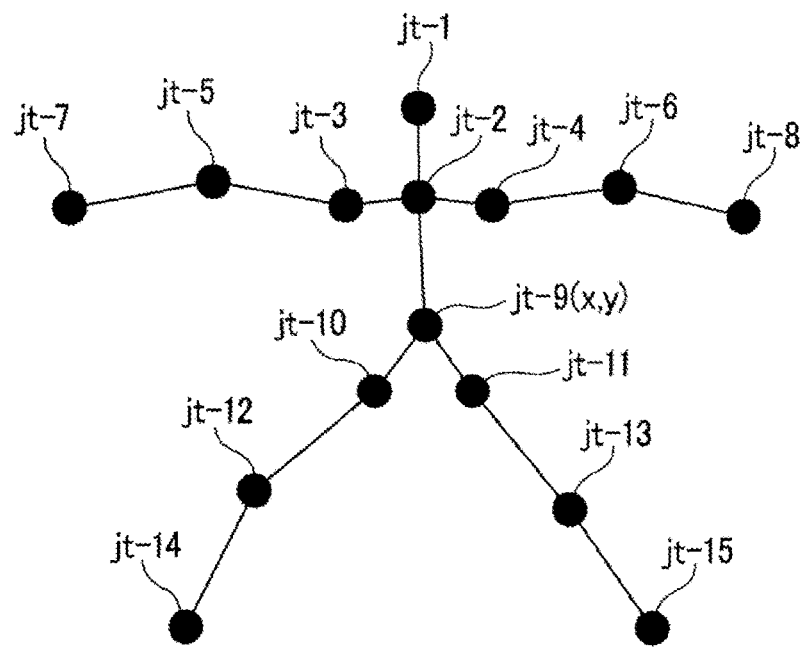
FIG. 4 is a diagram illustrating an example of a human body model.

FIG. 4 is a diagram illustrating the example human body model. The human body model illustrated in FIG. 4 includes fifteen nodal points jt-1 to jt-15 and fourteen sides. The nodal points jt-1, jt-2, jt-8, jt-9, and jt-15, for example, represent the positions of a head, a chest, a right hand, a waist, and a right foot, respectively. The number of sides connected to the nodal point jt-9, which represents the position of the waist, is three. The three sides are connected to the nodal point jt-2, which represents the position of the chest, the nodal point jt-10, which represents the position of a left-hand waist portion, and the nodal point jt-11, which represents the position of a right-hand waist portion, respectively. Use of such a human body model helps to limit patterns of posture models for human bodies. This leads to reductions in the amounts of computation required for a detection of the figure of the person by the human body determination unit 23 and a determination of the representative point by the representative point identification unit 24.

With reference to FIG. 3, a process performed by the human body determination unit 23 to detect the figure of the person will now be described below. A plurality of human body models are stored in the storage unit 27 in advance. Postures of human bodies represented by the respective human body models are different from one another. Each of the human body models stored in the storage unit 27 is associated with a different identification number in advance.

The human body determination unit 23 reads each one of the human body models from the storage unit 27. The human body determination unit 23 compares the extracted contour with the read human body model. In this comparison, the human body determination unit 23 displaces the intra-image coordinates (x, y) of each of the nodal points of the read human body model by a certain displacement amount (Δx, Δy). The human body determination unit 23 calculates a score for the extracted contour and the displaced intra-image coordinates (x+Δx, y+Δy) of each nodal point. The score is an index value indicating the degree of matching between a shape represented by the contour and a posture represented by the human body model. The human body determination unit 23 calculates the score for each one of the human body models with respect to each of a plurality of displacement amounts. Then, the human body determination unit 23 determines a set of the human body model and the displacement amount that gives the highest score among the calculated scores. In the following description, the highest score will be referred to as a maximum score.

The human body determination unit 23 determines that the image includes a figure of a person if the maximum score is equal to or higher than a predetermined lower-limit score. As a result, the posture and position of the person included in the image are identified. The human body determination unit 23 stores the identification number of the determined human body model and the displacement amount in the storage unit 27.

The human body determination unit 23 determines that a figure of a person is not included in the image if the maximum score is lower than the predetermined lower-limit score.

The representative point identification unit 24 reads, from the storage unit 27, the displacement amount and the human body model associated with the identification number stored in a predetermined period up to the present. The predetermined period is, for example, equal to a time interval at which the imaging unit 11 captures images of the subject.

The representative point identification unit 24 identifies, from among the nodal points of the read human body model, the nodal point that represents the position of the trunk of the human body. That is, the target identification unit 22 determines the nodal point that represents the position of the trunk of the person as the representative point. The trunk refers to a human body excluding the head and four limbs. The trunk does not move so frequently as the head and four limbs in daily movement of the person. Therefore, acquiring a change in the position of the trunk over time leads to a stable detection of a translational movement of the whole body of the person that accompanies a walk. Note that, although the trunk includes the chest, shoulders, and the waist, only the waist may be used as the nodal point representing the position of the trunk. The waist is less affected by movements of the head and four limbs than the others.

The representative point identification unit 24 adds the read displacement amount to the intra-image coordinates of the identified nodal point to determine intra-image coordinates of the representative point. The representative point identification unit 24 stores representative point data representing the determined intra-image coordinates in the storage unit 27. As described above, the intra-image coordinates (x, y) of the representative point and a distance value specified by the intra-image coordinates (x, y) of the representative point among distance values of the image data together indicate the position (X, Y, Z) of the representative point in a three-dimensional space.

The movement control unit 25 reads, from the storage unit 27, the representative point data stored in a predetermined period up to the present. The movement control unit 25 determines a movement target point which is a predetermined distance (e.g., 1.0 m) away from the representative point of the read representative point data. The movement control unit 25 calculates an amount of movement from the current reference point to the movement target point. The movement control unit 25 calculates a driving amount for a movement by the calculated amount of movement, and generates a control signal giving an instruction for a drive by the calculated driving amount. The movement control unit 25 outputs the generated control signal to each of the driving units 13-1 and 13-2. The driving units 13-1 and 13-2 cause the wheels 14-1 and 14-2 to rotate by the driving amount indicated by the control signal inputted from the movement control unit 25. The mobile unit 1 is thus caused to move on the basis of the amount of movement calculated by the movement control unit 25. An example of movement control performed by the movement control unit 25 will be described below.

The posture recognition unit 26 reads the contour data stored in the storage unit 27 in a predetermined period up to the present, and a posture model stored in advance. The posture model is a human body model representing a predetermined posture. The predetermined posture is, for example, a posture in which a person stands upright, facing the imaging unit 11, with a right upper arm pointed to the right in parallel with a horizontal plane and a left upper arm pointed in a vertical direction.

The posture recognition unit 26 compares the contour represented by the contour data with the posture model to determine whether the predetermined posture has been recognized. The fact that the predetermined posture has been recognized means that a figure of a person in the predetermined posture is included in the image used to generate the contour data.

In the comparison of the extracted contour with the posture model, the posture recognition unit 26, for example, calculates a score for the extracted contour and intra-image coordinates $(x+\Delta x, y+\Delta y)$ of each nodal point displaced using each of a plurality of displacement amounts. The human body determination unit 23 determines a maximum score, which is the highest of all the calculated scores. The posture recognition unit 26 determines that the predetermined posture has been recognized if the calculated maximum score is equal to or higher than a predetermined lower-limit score. The posture recognition unit 26 determines that the predetermined posture has not been recognized if the calculated maximum score is lower than the predetermined lower-limit score. If the comparison results in a success, the posture recognition unit 26 stores comparison data indicative of the success in the comparison in the storage unit 27. Then, the mobile unit control device 20 starts a mobile unit control process, which will be described below. The mobile unit control process includes control of the position and orientation of the mobile unit 1 by the movement control unit 25. Note that the posture recognition unit 26 may alternatively be a portion of the representative point identification unit 24. The structure of the mobile unit control device 20 can be simplified by the posture recognition unit 26 and the representative point identification unit 24 sharing a function.

The storage unit 27 includes a storage medium for storing various types of data. The storage unit 27 includes, for example, a read-only memory (ROM), a random-access memory (RAM), or the like.

(Movement Control)

Next, the movement control performed by the movement control unit 25 will now be described below.

Figure 5:
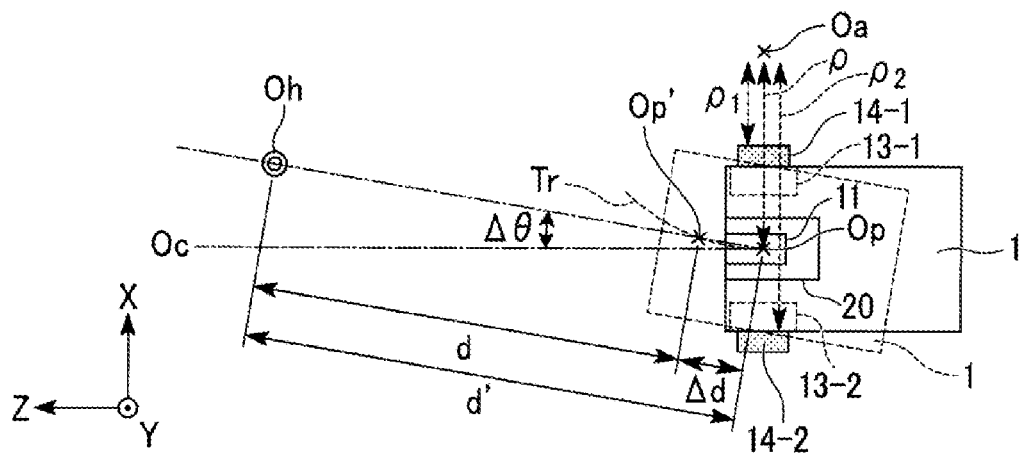
FIG. 5 is a plan view for explaining movement control according to the first preferred embodiment of the present invention.

FIG. 5 is a plan view for explaining the movement control according to the present preferred embodiment. A solid-line rectangle represents the mobile unit 1 at a certain time t. A broken-line rectangle represents the mobile unit 1 after moving to a movement target point Op', to which the mobile unit 1 is to be caused to move. In the following description, it is assumed that the representative point Oh is determined at the time t. The direction of the mobile unit 1 at the time t is indicated by Oc, and coincides with the direction of the optical axis of the imaging unit 11. Here, $\Delta\theta$ indicates the direction of the representative point Oh on the horizontal plane.

Next, the movement control unit 25 determines a position which is a predetermined distance d away from the representative point Oh and in the direction $\Delta\theta$ as the movement target point Op', and calculates the amount of movement from the reference point Op to the movement target point Op'. Specifically, the movement control unit 25 determines an arc Tr, and determines the distance of the determined arc Tr as a mean driving amount. The arc Tr has a tangent extending in the direction Oc at the reference point Op, and passes through the movement target point Op'. The mean driving amount is an arithmetic mean of the driving amount for the wheel 14-1 and the driving amount for the wheel 14-2. The movement control unit 25 calculates distances $\rho_1$ and $\rho_2$ from a center Oa of the determined arc Tr to the wheels 14-1 and 14-2, respectively. The movement control unit 25 calculates a ratio $r_1$ of the calculated distance $\rho_1$ to a distance $\rho$ from the center of the arc to the reference point Op, and a ratio $r_2$ of the calculated distance $\rho_2$ to the distance $\rho$. The movement control unit 25 multiplies the determined mean driving amount by the ratios $r_1$ and $r_2$ to calculate the driving amounts for the wheels 14-1 and 14-2, respectively.

The movement control unit 25 generates control signals giving instructions for drives by the respective calculated driving amounts. The movement control unit 25 outputs the generated control signals to the respective driving units 13-1 and 13-2. The driving units 13-1 and 13-2 cause the wheels 14-1 and 14-2 to rotate by the driving amounts indicated by the respective control signals inputted from the movement control unit 25.

The arc Tr determined by the movement control unit 25 corresponds to a path along which the mobile unit 1 moves from the reference point Op to the movement target point Op'. The distance $\rho$ corresponds to a radius of curvature of the arc Tr. In a case where the radius of curvature is equal to an interval between the wheels 14-1 and 14-2, the movement control unit 25 causes the mobile unit 1 to move while keeping one of the wheels 14-1 and 14-2 stationary. In a case where the radius of curvature is 0 (zero), the movement target point Op' coincides with the reference point Op, and the movement control unit 25 accordingly causes the wheels 14-1 and 14-2 to rotate in opposite directions at the same speed to cause the mobile unit 1 to rotate along the ground. In this case, the movement control unit 25 determines the driving amounts for the wheels 14-1 and 14-2 on the basis of the target direction $\Delta\theta$ and a distance $\rho$ from the midpoint between the wheels 14-1 and 14-2 to one of the wheels 14-1 and 14-2.

Suppose a case where a predetermined angular threshold value is sufficiently close to zero (e.g., 1.0°) and the absolute value of the direction $\Delta\theta$ is smaller than this threshold value. The field of vision of the imaging unit 11 extends forwardly of the mobile unit 1, and the movement target point Op' determined on the basis of the image can be considered to be forward of the reference point Op. In this case, the movement control unit 25 determines a difference obtained by subtracting the predetermined distance d from a calculated distance d' as the amount of movement from the reference point Op to the movement target point Op'. The movement control unit 25 determines the determined amount of movement as a driving amount common to the wheels 14-1 and 14-2. The movement control unit 25 generates a control signal giving an instruction for a drive by the determined driving amount. The movement control unit 25 outputs the generated control signal to each of the driving units 13-1 and 13-2. Note that in a case where the amount of movement has a positive value, the mobile unit 1 moves forward, whereas in a case where the amount of movement has a negative value, the mobile unit 1 moves backward. As described above, the movement control unit 25 is capable of causing the mobile unit 1 to move in an arbitrary direction on the ground.

Note that the movement control unit 25 may calculate a speed of travel of the mobile unit 1 in accordance with a previously-set acceleration/deceleration time T and the calculated distance d'. The speed of travel has an upper limit. In a case where the speed of travel at the time of a start of a movement is zero, for example, the speed of travel reaches the upper limit at a time when the acceleration/deceleration time T has elapsed since that time. Meanwhile, in an assumed case where the speed of travel is at the upper limit and a braking is started at a certain time, the speed of travel reaches zero at a time when the acceleration/deceleration time T has elapsed since that time. Accordingly, a plot of the speed with a horizontal axis representing time and a vertical axis representing the speed is in the shape of a trapezoid. However, depending on the distance d', the movement control unit 25 may start braking the mobile unit 1 before the acceleration/deceleration time T elapses since the time of the start of the movement. In this case, the plot of the speed will be in the shape of a triangle.

The image data acquired from the imaging unit 11 is not limited to the above-described depth map, but image data representing the distance d' for each set of intra-image coordinates (x, y) may be used. As described above, an X-coordinate is uniquely given on the basis of a horizontal coordinate x. The X-coordinate is a horizontal coordinate value in a three-dimensional space with the reference point Op at the origin. The movement control unit 25 calculates the target direction $\Delta\theta$ of the mobile unit 1 from the distance d' and the X-coordinate of the representative point Oh determined on the basis of the image data.

The movement control unit 25 calculates a speed decrease rate for each of the wheels 14-1 and 14-2 on the basis of the calculated target direction $\Delta\theta$ and the aforementioned speed of travel. The speed decrease rates are coefficients indicating a ratio between rotation rates of the wheels 14-1 and 14-2. Assuming, for example, that the target direction $\Delta\theta$ is 10°, when the speed decrease rate of the wheel 14-1 is 1, the speed decrease rate of the wheel 14-2 is 0.9. As a result, the mobile unit 1 is caused to move rightward or leftward while moving forward. In a case where the difference obtained by subtracting the predetermined distance d from the distance d', i.e., the amount $\Delta d$ of movement, has a negative value, the mobile unit 1 is caused to move rightward or leftward while moving backward.

The movement control unit 25 determines driving speeds for the wheels 14-1 and 14-2 in accordance with the value of the amount $\Delta d$ of movement as described below.

(1) In a case where the amount $\Delta d$ of movement has a positive value, the movement control unit 25 multiplies the aforementioned speed of travel by the speed decrease rates to determine the driving speeds for the respective wheels 14-1 and 14-2.

(2) In a case where the amount $\Delta d$ of movement is zero, the movement control unit 25 multiplies a previously-set maximum turning speed by the speed decrease rates to determine the driving speeds for the respective wheels 14-1 and 14-2.

(3) In a case where the amount $\Delta d$ of movement has a negative value, the aforementioned speed of travel also has a negative value. In this case, the movement control unit 25 multiplies the aforementioned speed of travel by the speed decrease rates to determine the driving speeds for the respective wheels 14-1 and 14-2.

The movement control unit 25 generates control signals giving instructions to cause the wheels 14-1 and 14-2 to rotate at the determined driving speeds, and outputs the generated control signals to the respective driving units 13-1 and 13-2.

Next, examples of the movement control according to the present preferred embodiment will be described.

Figure 6:
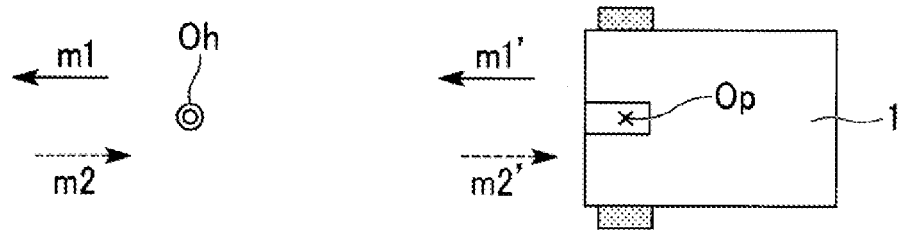
FIG. 6 shows plan views illustrating examples of the movement control according to the first preferred embodiment of the present invention.
Figure 6:
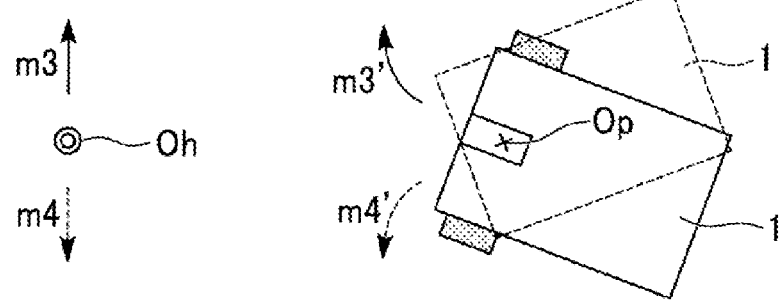

FIG. 6 shows plan views illustrating examples of the movement control according to the present preferred embodiment.

FIG. 6A illustrates example movements of the mobile unit 1. Arrow m1 indicates a case where the representative point Oh moves forward with respect to the mobile unit 1, thus becoming more distant from the mobile unit 1. In this case, the mobile unit 1 moves forward to approach the representative point Oh as indicated by arrow m1'. Arrow m2 indicates a case where the representative point Oh moves backward with respect to the mobile unit 1, thus approaching the mobile unit 1. In this case, the mobile unit 1 moves backward to become more distant from the representative point Oh as indicated by arrow m2'.

FIG. 6B illustrates other example movements of the mobile unit 1. Arrow m3 indicates a case where the representative point Oh moves rightward with respect to the mobile unit 1. In this case, the mobile unit 1 turns rightward to face the representative point Oh as indicated by arrow m3'. Arrow m4 indicates a case where the representative point Oh moves leftward. In this case, the mobile unit 1 turns leftward to face the representative point Oh as indicated by arrow m4'.

As described above, the movement control unit 25 is capable of causing the mobile unit 1 to follow a human body moving in an arbitrary direction on the ground. With this following movement, the distance from the reference point to the representative point approaches the predetermined distance. In a case where the predetermined distance is 1.0 m, for example, a person having an average upper limb length (which is about 72 cm for Japanese men) would not be able to touch the mobile unit 1 with an upper limb by extending the upper limb without walking. Meanwhile, the person would be able to touch the mobile unit with an upper limb by extending the upper limb while walking. That is, 1.0 m is such a distance as to allow a person with average measurements to have immediate access to the mobile unit 1 by tilting an upper part of the body or by extending an upper limb while moving a lower limb, without allowing the person to immediately touch the mobile unit 1. Moreover, 1.0 m is a distance shorter than a braking distance of the mobile unit 1 moving at an average walking speed (about 4 km/h) of a person.

Therefore, 1.0 m, which is an example of the predetermined distance, is an average distance that allows a person to be capable of immediate access without allowing a contact with a body of the person. The predetermined distance may not be exactly 1.0 m, but may be within a predetermined range from 1.0 m, e.g., in the range of 0.8 m to 1.2 m. The distance that allows a person to have immediate access to the mobile unit 1 without allowing a contact therewith varies in accordance with the measurements of a user, a walking speed, the speed of movement of the mobile unit, and other use conditions, and therefore, the predetermined distance may be varied in accordance with such use conditions.

(Mobile Unit Control Process)

Next, a mobile unit control process according to the present preferred embodiment will be described.

Figure 7:
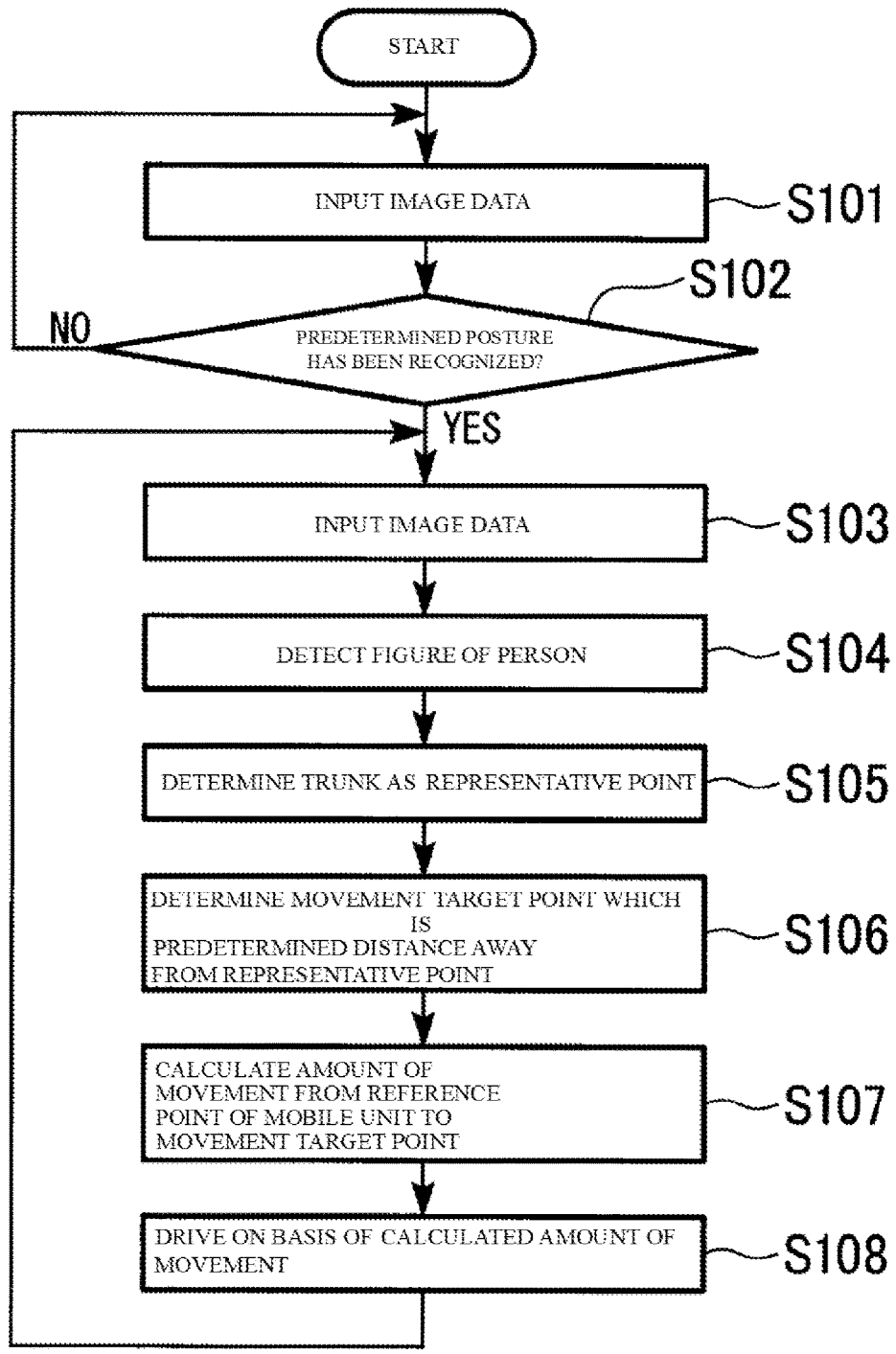
FIG. 7 is a flowchart illustrating a mobile unit control process according to the first preferred embodiment of the present invention.

FIG. 7 is a flowchart illustrating the mobile unit control process according to the present preferred embodiment. (Step S101) The image data is inputted from the imaging unit 11 to the image input unit 21. Thereafter, control proceeds to a process of step S102. (Step S102) The posture recognition unit 26 refers to posture model data stored in the storage unit 27, and determines whether the predetermined posture has been recognized in the image represented by the inputted image data. If the posture recognition unit 26 determines that the predetermined posture has been recognized ("YES" at step S102), control proceeds to a process of step S103. If the posture recognition unit 26 determines that the predetermined posture has not been recognized ("NO" at step S102), the process of step S101 is repeated.

(Step S103) The image data is inputted from the imaging unit 11 to the image input unit 21. Thereafter, control proceeds to a process of step S104. (Step S104) The human body determination unit 23 refers to human body model data stored in the storage unit 27, and detects a figure of a person from the image represented by the inputted image data. Thereafter, control proceeds to a process of step S105. (Step S105) The representative point identification unit 24 determines the nodal point for the trunk in the detected figure of the person as the representative point. Thereafter, control proceeds to a process of step S106.

(Step S106) The movement control unit 25 determines the movement target point which is the predetermined distance away from the representative point. Thereafter, control proceeds to a process of step S107. (Step S107) The movement control unit 25 calculates the amount of movement from the reference point of the mobile unit 1 to the movement target point. Thereafter, control proceeds to a process of step S108. (Step S108) The movement control unit 25 drives the driving units 13-1 and 13-2 on the basis of the calculated amount of movement. Thereafter, control proceeds to step S103.

(Modifications)

While the case where the representative point identification unit 24 uses the image data acquired at one time and determines the representative point at that time has been described above by way of example, the representative point identification unit 24 may determine the representative point in each of a plurality of images captured by the imaging unit 11 in sequence. In this case, the representative point identification unit 24 extracts the representative point from each of the plurality of images captured by the imaging unit 11 in sequence. The movement control unit 25 controls the movement of the mobile unit 1 on the basis of a change over time in the position of the representative point extracted by the representative point identification unit 24.

Here, the representative point identification unit 24 tracks the current representative point using representative points acquired in a predetermined period up to the present. This operation is referred to as tracking. In the tracking, the representative point identification unit 24 calculates the current representative point by subjecting the representative points acquired in the predetermined period up to the present to linear prediction. The representative point identification unit 24 determines the current representative point from the image data acquired at present employing the above-described technique. Here, when comparing the extracted contour with the human body model, the human body determination unit 23 determines a displacement amount that gives intra-image coordinates for the representative point determined by the tracking as a prediction displacement amount. Then, the human body determination unit 23 calculates a score for each of a plurality of displacement amounts within a predetermined search range from the determined prediction displacement amount, and determines the maximum score among the calculated scores. The representative point identification unit 24 calculates a distance between the representative point determined by the tracking and the representative point determined on the basis of the image data. The representative point identification unit 24 updates a linear prediction coefficient on the basis of the calculated distance using, for example, a least squares method.

The human body determination unit 23 is thus able to limit the search range of the displacement amounts for searching for the maximum score when comparing the extracted contour with the human body model. In other words, a load of processing for determining whether a figure of a person is included in the image, and identifying the posture and position of a human body from the figure of the person represented by the image is reduced. That is, the entire figure of the person does not need to be included in the image. Moreover, a displacement of the representative point due to vibration of the mobile unit 1 is reduced, so that the representative point can follow a translational movement of the mobile unit 1 with high precision.

While the case where the representative point identification unit 24 determines the nodal point representing the position of the trunk of the human body as the representative point has been mainly described above by way of example, the representative point identification unit 24 may determine a nodal point representing the position of another portion as the representative point. In this case, the representative point identification unit 24 may track the current representative point. In this tracking, a movement model representing a movement pattern of the nodal point may be used to predict the representative point. In a case where a nodal point representing the position of a left lower limb is used, for example, the movement model includes a coefficient representing a forward/backward movement of the left lower limb that accompanies a walk. Use of this movement model reduces a displacement of the representative point caused by the forward/backward movement that accompanies a walk, making it possible to estimate the representative point in accordance with a translational movement.

As described above, the mobile unit control device 20 according to the present preferred embodiment is provided with the imaging unit 11, which, when installed on the mobile unit 1, captures at least a portion of the surroundings of the mobile unit 1 to obtain the image thereof. The mobile unit control device 20 includes the representative point identification unit 24, which, when the image captured by the imaging unit 11 includes a figure of a person, determines a trunk of the person in the figure of the person as the representative point. The mobile unit control device 20 includes the movement control unit 25, which controls the movement of the mobile unit on the basis of the position of the representative point determined by the representative point identification unit 24 in the image.

Having the above structure, the mobile unit control device 20 is able to use the position of the trunk of the person determined from the captured image when controlling the movement of the mobile unit. This makes it possible to grasp even a complicated movement of the person with the image in a centralized manner, and seize a translational movement of the person, enabling the mobile unit to follow the person with a simple structure.

In the mobile unit control device 20 according to the present preferred embodiment, the representative point identification unit 24 extracts the representative point from each of the plurality of images captured by the imaging unit 11 in sequence. The movement control unit 25 is capable of controlling the movement of the mobile unit on the basis of the change over time in the position of the representative point extracted by the representative point identification unit 24.

This structure makes it possible to estimate a tendency of the movement of the person on the basis of the change over time in the position of the representative point. The estimated tendency of the movement of the person can be used to reduce a load in processing.

In the mobile unit control device 20 according to the present preferred embodiment, the posture recognition unit 26 causes the movement control unit 25 to start controlling the movement of the mobile unit on the basis of the representative point, when it is determined that a figure of a person in a predetermined posture is included in the image captured by the imaging unit 11.

This structure enables a person to give an instruction to start the control by assuming a predetermined posture, without touching the mobile unit control device 20. The mobile unit control device 20 does not need to include a component for accepting the instruction to start the control from the person, making it possible to limit an increase in the number of parts thereof.

In the mobile unit control device 20 according to the present preferred embodiment, the movement control unit 25 controls the movement of the mobile unit 1 so that the distance between the representative point and the reference point of the mobile unit 1 will be equal to a predetermined distance.

With this structure, the control is performed so that the distance between the person and the mobile unit 1 will be equal to the predetermined distance. This makes it possible to control the position of the mobile unit 1 to be kept within a range that attention of the person can cover, and at the same time prevent the mobile unit 1 from coming into contact with the person.

Second Preferred Embodiment

Next, a second preferred embodiment of the present invention will be described. Members or portions that have their equivalents in the above-described preferred embodiment are denoted by the same reference numerals as those of their equivalents in the above-described preferred embodiment, and descriptions of those members or portions are omitted.

In a mobile unit control device 20 according to the present preferred embodiment, a movement control unit 25 changes the orientation of a mobile unit 1 when a representative point identification unit 24 is unable to determine a representative point.

The representative point identification unit 24 is unable to determine the representative point in the following cases.

(1) A case where a human body determination unit 23 is unable to detect a figure of a person from an acquired image. Examples of this case include a case where a person is outside of the field of vision of an imaging unit 11, so that a figure of the person is not included in the image; and a case where a vibration of the mobile unit 1 has caused a "blur" of the image. The human body determination unit 23 can determine that a figure of a person cannot be detected when the above-described maximum score is lower than a predetermined threshold value of the score.

(2) A case where the representative point identification unit 24 is unable to determine the representative point from the detected figure of the person. Examples of this case include a case where the detected figure of the person does not include a nodal point representing the position of the trunk, which is to be detected; and a case where a depth value Z for the intra-image coordinates (x, y) of the representative point is abnormal (e.g., zero or less).

Next, a process performed by the movement control unit 25 to change the orientation of the mobile unit 1 will be described. The process of changing the orientation of the mobile unit 1 will be referred to as a direction changing process.

Figure 8:
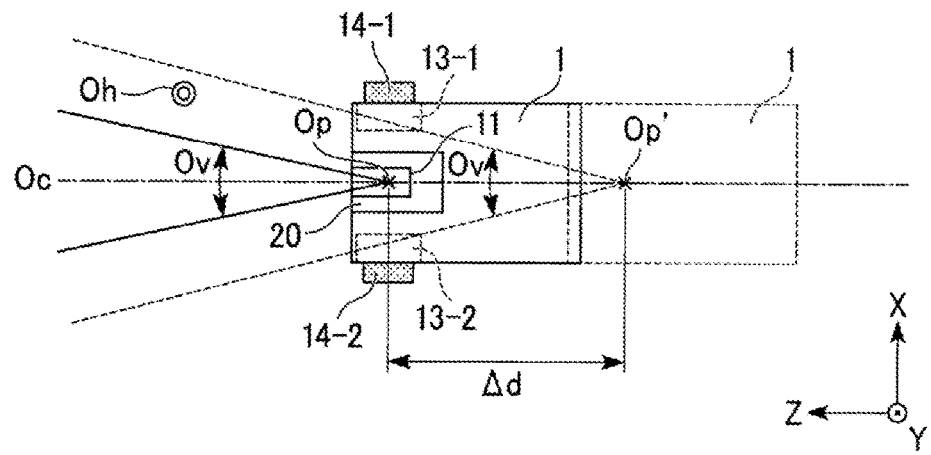
FIG. 8 is a plan view for explaining an example of a direction changing process according to a second preferred embodiment of the present invention.
Figure 9:
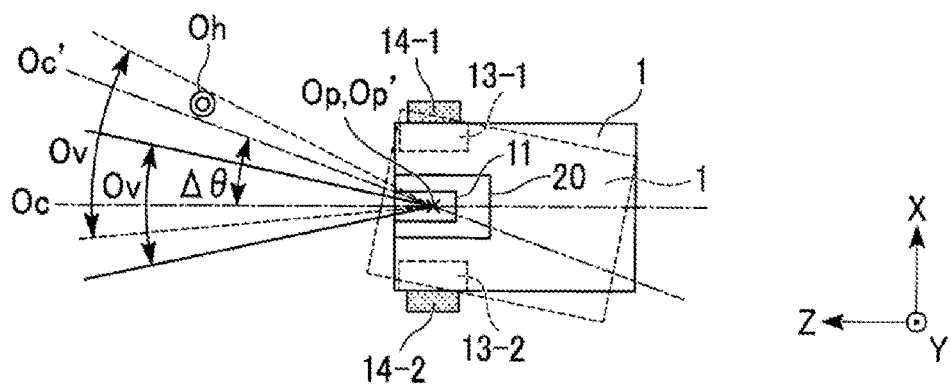
FIG. 9 is a plan view for explaining another example of the direction changing process according to the second preferred embodiment of the present invention.

Each of FIGS. 8 and 9 is a plan view for explaining an example of the direction changing process according to the present preferred embodiment. Forms of the direction changing process include the following two forms (1) and (2). Which of the forms (1) and (2) is to be carried out may be set in the movement control unit 25 in advance.

(1) The mobile unit 1 is caused to move backward. As illustrated in FIG. 8, in a case where a figure of a person cannot be detected, the intra-image coordinates of the representative point Oh may be outside of the range of the image. This means that the representative point Oh is outside of the field Ov of vision of the imaging unit 11.

Accordingly, the movement control unit 25 determines a moving direction of the mobile unit 1 to be a backward direction, and causes the mobile unit 1 to move backward by a predetermined amount Δd of movement. Here, the movement control unit 25 sets a movement target point Op' at a position the amount Δd of movement behind a current reference point Op. The movement control unit 25 performs the above-described movement control on the basis of the amount Δd of movement to the set movement target point Op'. Once the mobile unit 1 is caused to move backward, the field Ov of vision of the imaging unit 11 will cover objects located in a wider range in front in horizontal directions than before the backward movement. In the example illustrated in FIG. 8, the field Ov of vision will cover a figure of a person. As a result, the representative point identification unit 24 is able to determine the representative point Oh again.

The amount Δd of movement may be a distance (e.g., 0.3 m) sufficiently smaller than a range (e.g., 0.5 to 3.5 m) of a distance d' that allow the representative point identification unit 24 to determine the representative point Oh. Limiting the amount Δd of movement reduces the likelihood that the mobile unit 1 will come into contact with an object behind the mobile unit 1.

(2) The direction of the mobile unit 1 is changed horizontally. In the example illustrated in FIG. 9, the movement control unit 25 determines the movement target point Op' to be the same as the reference point Op, determines a target direction Δθ to be a predetermined angle rightward from the forward direction, and performs the above-described movement control on the basis of the target direction Δθ. Causing the mobile unit 1 to turn rightward causes the field Ov of vision of the imaging unit 11 to cover objects located to the right of the field Ov of vision before the movement. In the example illustrated in FIG. 9, the field Ov of vision will come to cover a figure of a person. As a result, the representative point identification unit 24 is able to determine the representative point Oh again. Note that the target direction Δθ may not necessarily be a rightward direction, but may alternatively be a leftward direction. The predetermined angle that gives the target direction Δθ may be smaller than the angle of the field of vision of the imaging unit 11. By repeating the direction changing process, the mobile unit control device 20 could search 360 degrees for a figure of a person.

(Mobile Unit Control Process)

Next, a mobile unit control process according to the present preferred embodiment will be described.

Figure 10:
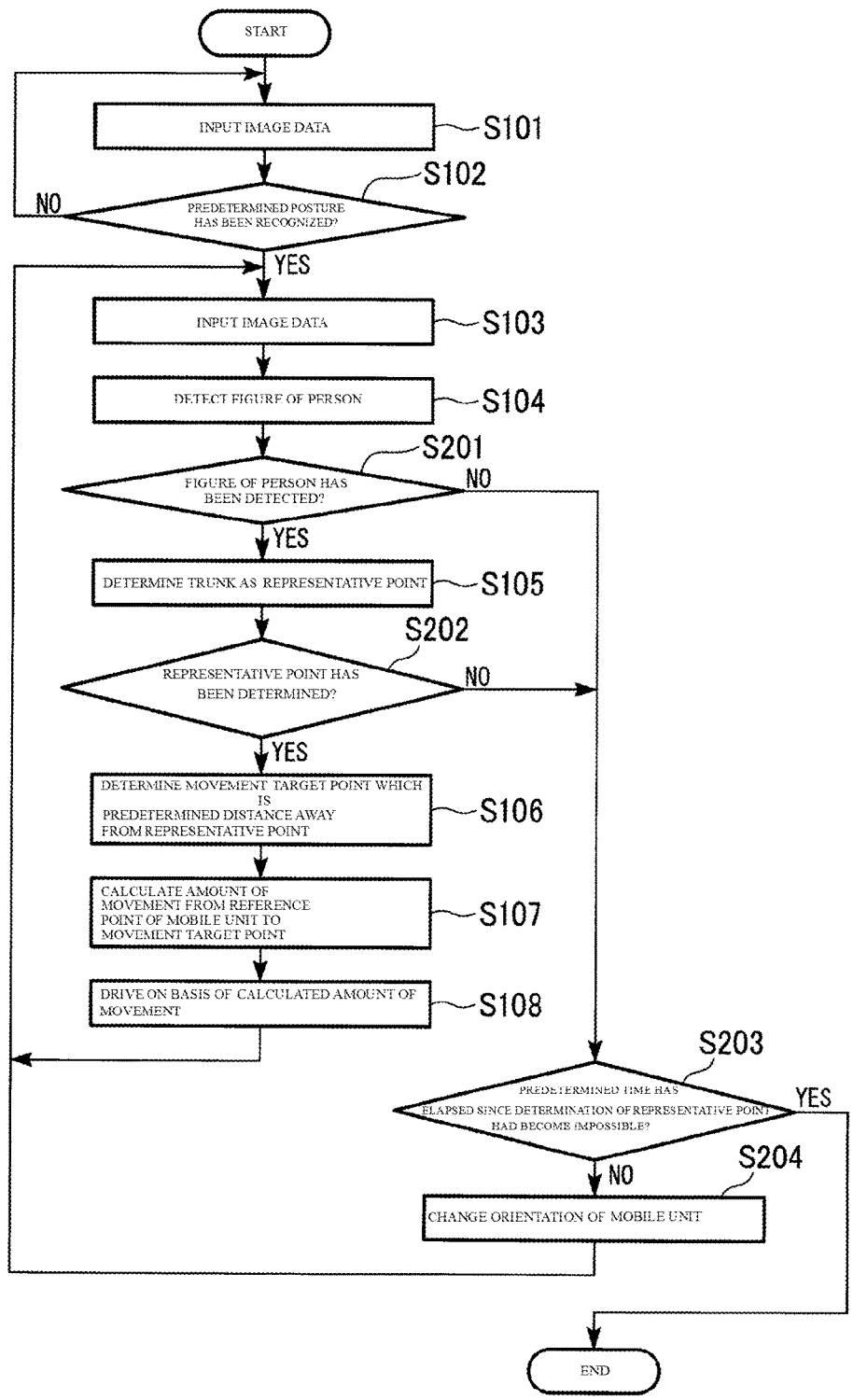
FIG. 10 is a flowchart illustrating a mobile unit control process according to the second preferred embodiment of the present invention.

FIG. 10 is a flowchart illustrating the mobile unit control process according to the present preferred embodiment.

The mobile unit control process illustrated in FIG. 10 includes the processes of steps S101 to S108 and processes of steps S201 to S204. The processes of steps S101 to S108 are similar to those described above.

After the processes of steps S101 to S104 are completed, control proceeds to step S201. (Step S201) The human body determination unit 23 determines whether a figure of a person has been detected from the image represented by the inputted image data. If the human body determination unit 23 determines that a figure of a person has been detected ("YES" at step S201), control proceeds to the process of step S105. After the process of step S105 is completed, control proceeds to the process of step S202. If the human body determination unit 23 determines that a figure of a person has not been detected ("NO" at step S201), control proceeds to the process of step S203. (Step S202) The representative point identification unit 24 determines whether the representative point has been determined from the detected figure of the person. If the representative point identification unit 24 determines that the representative point has been determined ("YES" at step S202), control proceeds to the process of step S106. If the representative point identification unit 24 determines that the representative point has not been determined ("NO" at step S202), control proceeds to the process of step S203.

(Step S203) The representative point identification unit 24 determines whether an elapsed time from a time at which the determination of the representative point had become impossible has become equal to or greater than a predetermined threshold value (e.g., 15 seconds) of the elapsed time. If the representative point identification unit 24 determines that the elapsed time has become equal to or greater than the predetermined threshold value ("YES" at step S203), the procedure illustrated in FIG. 10 is ended. If the representative point identification unit 24 determines that the elapsed time has not yet become equal to or greater than the predetermined threshold value ("NO" at step S203), control proceeds to the process of step S204. (Step S204) The movement control unit 25 changes the orientation of the mobile unit 1. Here, the movement control unit 25 performs the above-described direction changing process. Thereafter, control proceeds to the process of step S103.

In accordance with the mobile unit control process illustrated in FIG. 10, the movement control unit 25 continues to change the orientation of the mobile unit 1 until the representative point identification unit 24 becomes able to determine the representative point. As a result, the movement control unit 25 can restart the control of causing the mobile unit 1 to follow the person. However, when a time equal to or longer than the predetermined elapsed time has passed since the time at which the determination of the representative point had become impossible, the movement control unit 25 stops the mobile unit control process.

Note that, when the movement control unit 25 causes the mobile unit 1 to move backward, the movement target point Op' may become outside of a predetermined backing range. The predetermined backing range is a range having, as a lower limit and an upper limit, a value $d_{min}'+\delta d$ which is equal to a lower limit $d_{min}'$ of the range of the distance d' that allows the representative point identification unit 24 to determine the representative point plus a predetermined limit value $\delta d$, and a value $d_{max}'-\delta d$ which is equal to an upper limit $d_{max}'$ of the above range minus the predetermined limit value $\delta d$, respectively. If this happens, the movement control unit 25 may stop the above-described mobile unit control process. Thus, the moving range of the mobile unit 1 can be limited so that the moving range is within the range of the distance d' that allows the representative point identification unit 24 to determine the representative point.

(Modification)

Next, a modification of the present preferred embodiment will be described. The movement control unit 25 may determine the orientation of the mobile unit 1 on the basis of sets of intra-image coordinates (x, y) of the representative points determined in a predetermined period up to the present. In a case where the intra-image coordinates (x, y) of the representative point at a previous time are included in a region of a predetermined width extending from one horizontal end of an image, the movement control unit 25 determines to orient the mobile unit 1 toward the one horizontal end. In a case where the intra-image coordinates (x, y) of the representative point at the previous time are included in a region of a predetermined width extending from another horizontal end of the image, the movement control unit 25 determines to orient the mobile unit 1 toward the other horizontal end. The previous time refers to a time at which image data that was acquired immediately before image data that is currently being processed was processed. The predetermined width is smaller than a half of the horizontal dimension of the image. In other cases, the movement control unit 25 determines to cause the mobile unit 1 to move backward. A process of determining the orientation of the mobile unit 1 will be referred to as a direction determination process.

Figure 11:
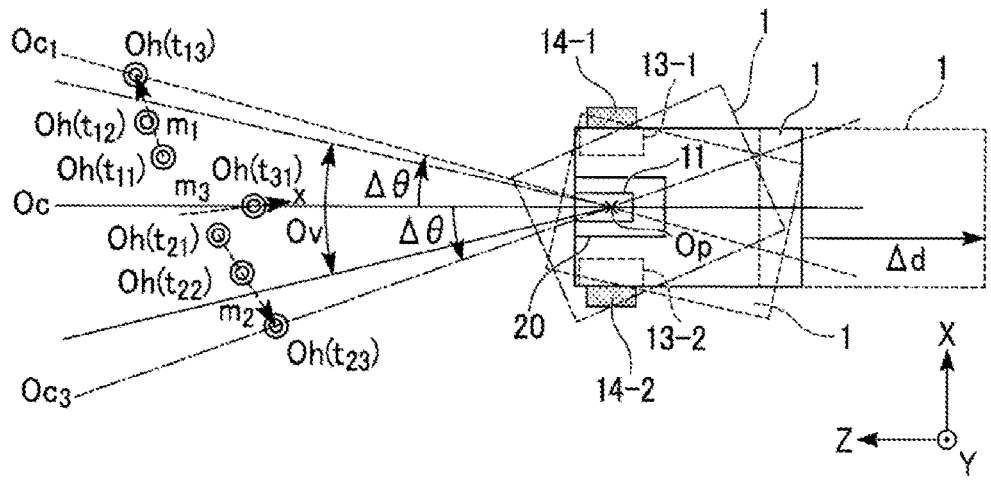
FIG. 11 is a plan view for explaining a direction determination process according to a modification of the second preferred embodiment of the present invention.

FIG. 11 is a plan view for explaining the direction determination process according to the present modification.

Each of arrows $m_1$, $m_2$, and $m_3$ indicates a movement of a person. Double circles represent representative points Oh(t) at various times t. For example, representative points $Oh(t_{11})$, $Oh(t_{12})$, and $Oh(t_{13})$ represent the positions of the person at times $t_{11}$, $t_{12}$, and $t_{13}$, respectively.

Arrow $m_1$ indicates a rightward movement of the person in front of the mobile unit 1. The person stays within the field Ov of vision of the imaging unit 11 until time $t_{12}$, and thereafter, the person gets out of the field Ov of vision. Accordingly, at time $t_{13}$, the representative point identification unit 24 determines that the determination of the representative point has become impossible. Then, the movement control unit 25 reads, from the storage unit 27, representative point data for the previous time $t_{12}$. The intra-image coordinates (x, y) of the representative point represented by the read representative point data are included in a region of the predetermined width extending from a right end of the image. Accordingly, the movement control unit 25 determines the moving direction of the mobile unit 1 to be a rightward direction. Then, the movement control unit 25 shifts the orientation of the mobile unit 1 rightward by the target direction $\Delta\theta$.

Arrow $m_2$ indicates a leftward movement of the person in front of the mobile unit 1. The person stays within the field Ov of vision of the imaging unit 11 until time $t_{22}$, and thereafter, the person gets out of the field Ov of vision. Accordingly, at time $t_{23}$, the representative point identification unit 24 determines that the determination of the representative point has become impossible. Then, the movement control unit 25 reads, from the storage unit 27, representative point data for the previous time $t_{22}$. The intra-image coordinates (x, y) of the representative point represented by the read representative point data are included in a region of the predetermined width extending from a left end of the image. Accordingly, the movement control unit 25 determines the moving direction of the mobile unit 1 to be a leftward direction. Then, the movement control unit 25 shifts the orientation of the mobile unit 1 leftward by the target direction $\Delta\theta$.

Arrow $m_3$ indicates an approach of the person to the mobile unit 1. At time $t_{31}$, the person is directly in front of the mobile unit 1 of the imaging unit 11. The symbol "x" at an end of arrow $m_3$ indicates a subsequent failure of the representative point identification unit 24 to determine the representative point. At this time, the movement control unit 25 reads the representative point data from the storage unit 27. The intra-image coordinates (x, y) of the representative point represented by the representative point data are substantially in a center of the image, and are therefore not included in either the region of the predetermined width extending from the left end of the image or the region of the predetermined width extending from the right end of the image. Accordingly, the movement control unit 25 determines to cause the mobile unit 1 to move backward. Then, the movement control unit 25 causes the mobile unit 1 to move backward by the amount $\Delta d$ of movement.

Figure 12:
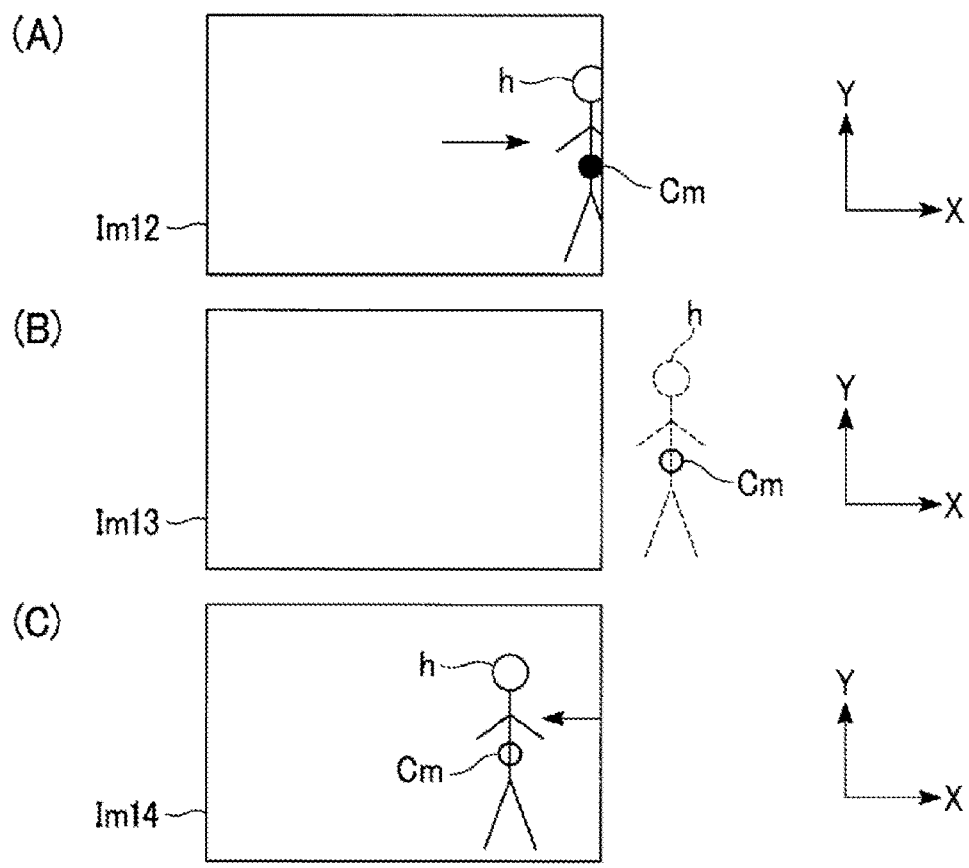
FIG. 12 shows diagrams illustrating examples of images captured.

Next, examples of images captured by the imaging unit 11 will be described with reference to an example case where the person moves in the manner indicated by arrow $m_1$. FIG. 12 shows the examples of the images captured by the imaging unit 11.

FIG. 12A shows an image $Im_{12}$ captured at time $t_{12}$. The image $Im_{12}$ represents a person h moving rightward. Here, Cm indicates the intra-image coordinates (x, y) of the representative point, representing the position of the person h in the image $Im_{12}$. A figure of the person h is at a position closer to the right end than to the left end of the image $Im_{12}$.

FIG. 12B shows an image $Im_{13}$ captured at time $t_{13}$. The figure of the person h is not included in the image $Im_{13}$. A broken-line figure represents a figure of the person h that would be recognized if the field of vision extended so far. The figure of the person h and hence the intra-image coordinates (x, y) of the representative point are not included in the image $Im_{13}$, and the representative point identification unit 24 accordingly determines that the determination of the representative point has become impossible. Then, the movement control unit 25 reads, from the storage unit 27, the representative point data for the previous time $t_{12}$. The intra-image coordinates (x, y) of the representative point represented by the read representative point data are included in the region of the predetermined width extending from the right end of the image. Accordingly, the movement control unit 25 determines the moving direction of the mobile unit 1 to be a rightward direction. Then, the movement control unit 25 shifts the orientation of the mobile unit 1 rightward by the target direction $\Delta\theta$.

FIG. 12C shows an image $Im_{14}$ captured at time $t_{14}$. A rightward rotation of the orientation of the imaging unit 11 causes the person to be included in the field Ov of vision of the imaging unit 11. Accordingly, the representative point identification unit 24 becomes able to determine the representative point again.

(Direction Determination Process)

Next, the direction determination process according to the present modification will be described. The movement control unit 25 starts the direction determination process as described below if the representative point identification unit 24 determines at step S203 (FIG. 10) that the elapsed time has not yet become equal to or greater than the predetermined threshold value ("NO" at step S203).

Figure 13:
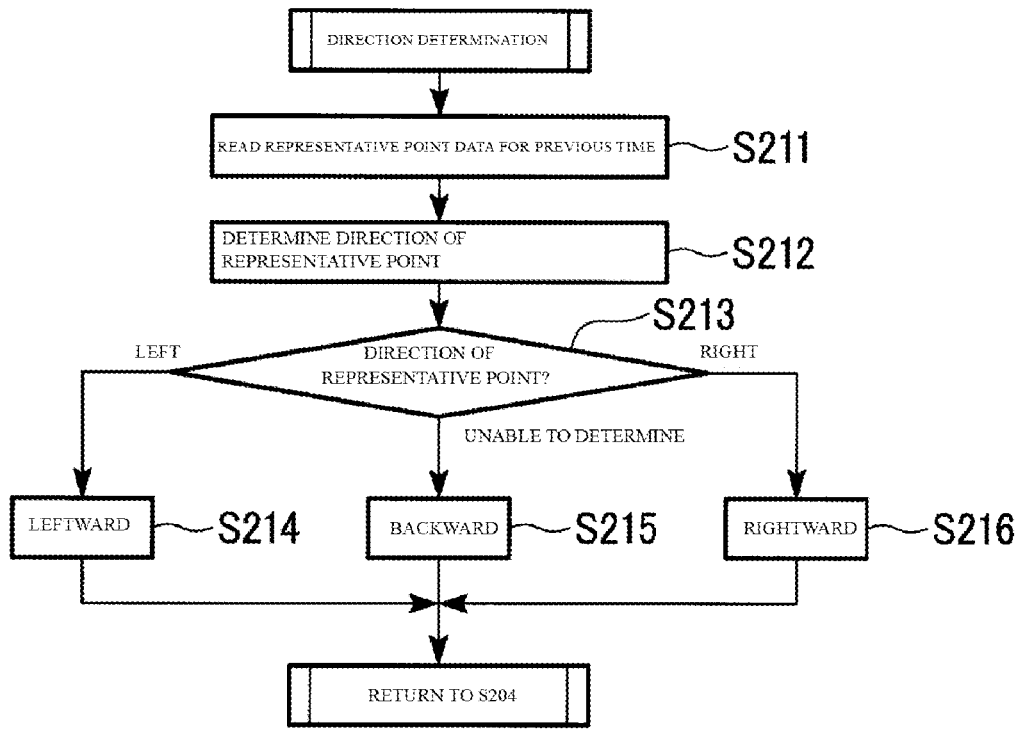
FIG. 13 is a flowchart illustrating a direction determination process according to a modification of the second preferred embodiment of the present invention.

FIG. 13 is a flowchart illustrating the direction determination process according to the present modification.

(Step S211) The movement control unit 25 reads, from the storage unit 27, the representative point data for the previous time. Thereafter, control proceeds to step S212.

(Step S212) The movement control unit 25 determines the direction of the representative point of the read representative point data. Here, if the intra-image coordinates (x, y) of the representative point represented by the representative point data are included in the predetermined region extending from the right end of the image, the movement control unit 25 determines the direction of the representative point to be a rightward direction. If the intra-image coordinates (x, y) of the representative point are included in the predetermined region extending from the left end of the image, the movement control unit 25 determines the direction of the representative point to be a leftward direction. If the intra-image coordinates (x, y) of the representative point are not included in either the predetermined region extending from the left end of the image or the predetermined region extending from the right end of the image, the direction of the representative point cannot be determined. Thereafter, control proceeds to step S213.

(Step S213) If the direction of the representative point determined by the movement control unit 25 is a leftward direction ("LEFT" at step S213), control proceeds to a process of step S214. If the direction of the representative point cannot be determined ("UNABLE TO DETERMINE" at step S213), control proceeds to a process of step S215. If the direction of the representative point determined by the movement control unit 25 is a rightward direction ("RIGHT" at step S213), control proceeds to a process of step S216.

(Step S214) The movement control unit 25 sets the target direction Δθ such that the orientation of the mobile unit 1 will be turned leftward. Thereafter, control proceeds to the process of step S204 (FIG. 10).

(Step S215) The movement control unit 25 sets the amount Δd of movement such that the mobile unit 1 will be caused to move backward. Thereafter, control proceeds to the process of step S204.

(Step S216) The movement control unit 25 sets the target direction Δθ such that the orientation of the mobile unit 1 will be turned rightward. Thereafter, control proceeds to the process of step S204 (FIG. 10).

In accordance with the above-described direction determination process, in the case where the intra-image coordinates (x, y) of the representative point determined at the previous time are included in the region of the predetermined width extending from one horizontal end of the image, the movement control unit 25 determines to orient the mobile unit 1 toward the direction of the one horizontal end. Then, the movement control unit 25 causes the mobile unit 1 to move in that direction. The mobile unit 1 is thus caused to move in the direction of where the person was immediately before, making it possible to recognize the person again with a small amount of movement.

If a representative pixel of the representative point determined at the previous time is not included in the region of the predetermined width extending from either horizontal end of the image, the movement control unit 25 determines to cause the mobile unit 1 to move backward. Then, the movement control unit 25 causes the mobile unit 1 to move backward. As a result, the movement control unit 25 is able to use an image capturing a wider range to recognize the person again.

While the case where the movement control unit 25 determines the orientation of the mobile unit 1 on the basis of the representative point determined at the previous time has been described above by way of example, this is not essential to the present invention. The movement control unit 25 may alternatively determine the orientation of the mobile unit 1 on the basis of the representative point determined at each of a plurality of times in a predetermined period (e.g., two seconds) up to the present.

Thus, even when the determination of the representative point has become temporarily impossible, the representative point identification unit 24 is able to use the representative point determined at a time in the past. This enables the movement control unit 25 to stably determine the orientation of the mobile unit 1.

(Installation of Object Detection Unit)

Figure 14:
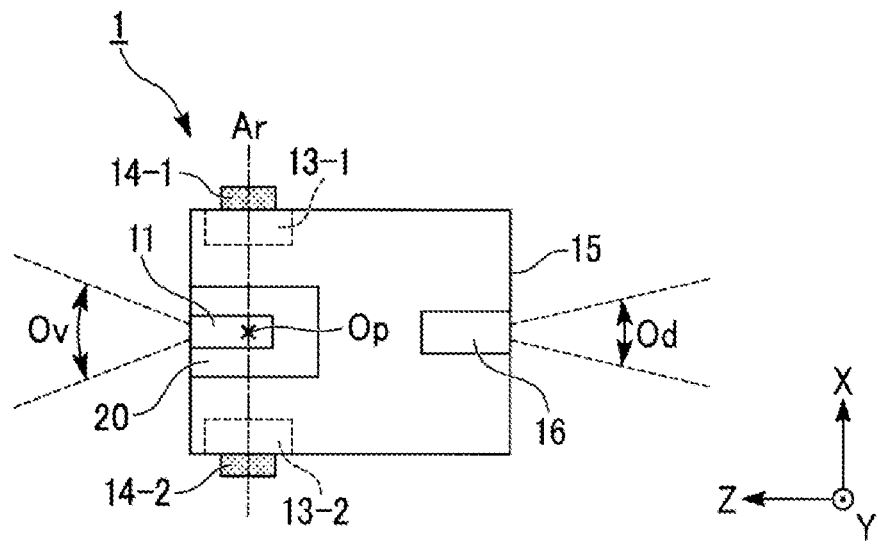
FIG. 14 is a plan view illustrating the structure of a mobile unit according to a modification of the second preferred embodiment of the present invention.

Further, an object detection unit 16 may be installed on the mobile unit 1 as illustrated in FIG. 14.

FIG. 14 is a plan view illustrating the structure of a mobile unit 1 according to the present modification. The object detection unit 16 is installed on a base 15 to detect an object located in a detection range in a surrounding area. The detection range Od, an object in which the object detection unit 16 is able to detect, is directed backward of the mobile unit 1. The detection range Od is directed in a direction opposite to a direction in which the field Ov of vision of an imaging unit 11 is directed, and does not overlap with the field Ov of vision. Accordingly, the object detection unit 16 is capable of detecting an object located at the back. The object detection unit 16 outputs target data representing the position of a detected object to a mobile unit control device 20. The object detection unit 16 is, for example, a radar device, an infrared sensor, a magnetic sensor, or the like. Note that the object detection unit 16 may be detachable from the base 15.

Figure 15:
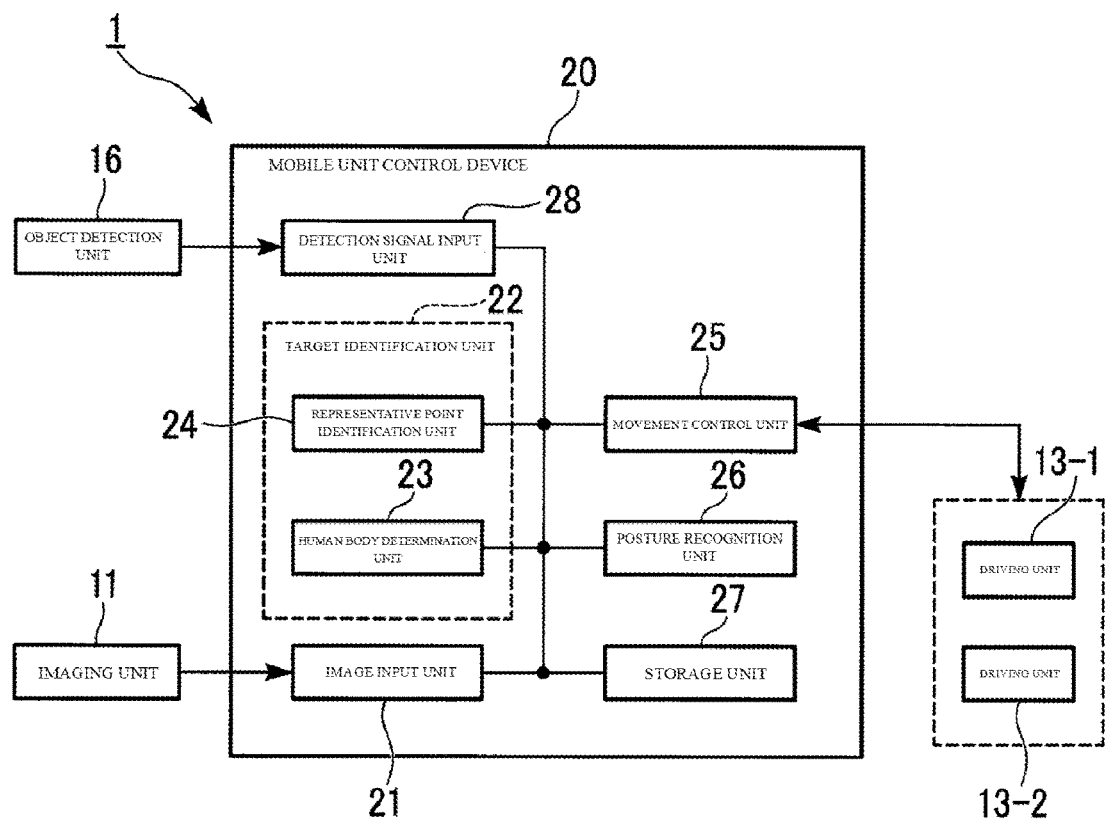
FIG. 15 is a block diagram of a mobile unit control device according to a modification of the second preferred embodiment of the present invention.

FIG. 15 is a block diagram of the mobile unit control device 20 according to the present modification. The mobile unit control device 20 further includes a detection signal input unit 28, when compared to the mobile unit control device 20 illustrated in FIG. 3.

The detection signal input unit 28 stores the target data inputted from the object detection unit 16 sequentially in a storage unit 27. The detection signal input unit 28 is, for example, an input/output interface. The detection signal input unit 28 may be an input/output interface shared by an image input unit 21.

A movement control unit 25 reads the target data from the storage unit 27. The movement control unit 25 calculates a distance between a representative point determined by a representative point identification unit 24 and a position represented by the read target data. If the calculated distance is equal to or smaller than a predetermined threshold distance value (e.g., 0.5 m), the movement control unit 25 outputs a driving stop signal giving an instruction to stop the driving to each of driving units 13-1 and 13-2.

Once the driving stop signal is inputted from the movement control unit 25, the driving units 13-1 and 13-2 stop rotation of wheels 14-1 and 14-2, respectively.

Thus, the movement control unit 25 is capable of detecting the position of an object at the back, which is not included in the field of vision of the imaging unit 11. The movement control unit 25 is capable of stopping the movement of the mobile unit 1 when the mobile unit 1, having been caused to move backward, comes close to the detected object. The mobile unit control device 20 is thus able to prevent the mobile unit 1 from coming into contact with the detected object.

As described above, the movement of the mobile unit 1 to be controlled by the mobile unit control device 20 according to the present preferred embodiment includes the moving direction of the mobile unit 1. When the representative point identification unit 24 is unable to determine the representative point, the movement control unit 25 changes the orientation of the mobile unit 1.

Accordingly, the mobile unit 1 can be caused to move toward the position at which a figure of a person is included in the image captured by the imaging unit 11, or in the direction thereof. The representative point identification unit 24 is thus able to determine the representative point again, and accordingly, the movement control unit 25 is able to restart the control of the mobile unit 1.

Third Preferred Embodiment

Next, a third preferred embodiment of the present invention will be described. Members or portions that have their equivalents in the above-described preferred embodiment are denoted by the same reference numerals as those of their equivalents in the above-described preferred embodiment, and descriptions of those members or portions are omitted.

Figure 16:
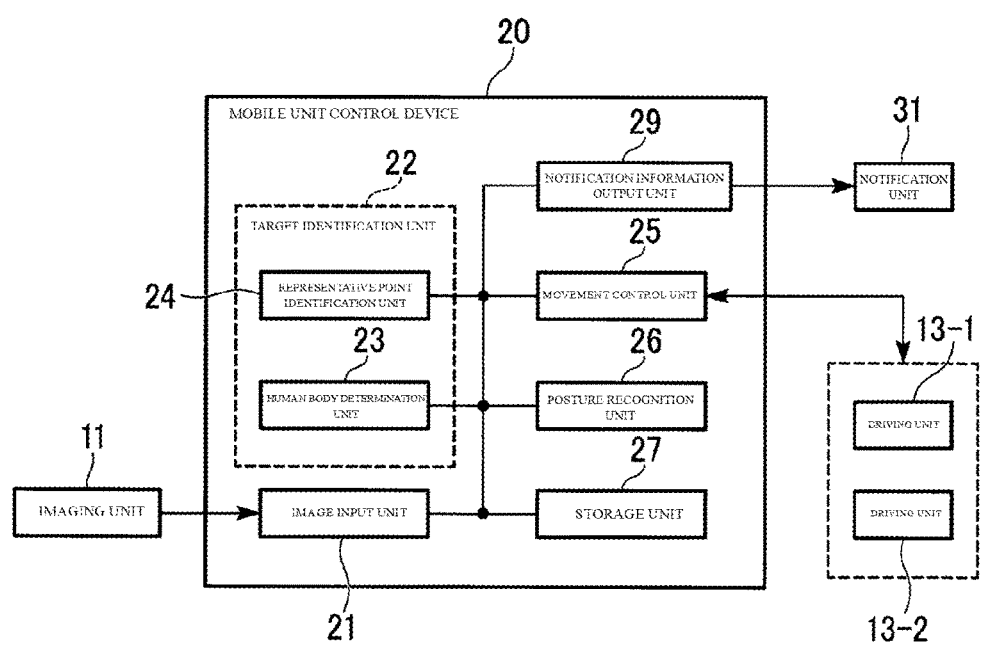
FIG. 16 is a block diagram illustrating the structure of a mobile unit control device according to a third preferred embodiment of the present invention.

FIG. 16 is a block diagram illustrating the structure of a mobile unit control device 20 according to the present preferred embodiment.

The mobile unit control device 20 according to the present preferred embodiment further includes a notification information output unit (control unit) 29, when compared to the mobile unit control device 20 illustrated in FIG. 3. The mobile unit control device 20 may be further provided with a notification unit 31.

When a representative point identification unit 24 is unable to determine the representative point, the representative point identification unit 24 stores error data indicating the inability to determine the representative point in a storage unit 27.

The notification information output unit 29 monitors whether the error data has been stored in the storage unit 27 in a predetermined period up to the present. If the notification information output unit 29 detects a storage of the error data, the notification information output unit 29 generates notification information data. The notification information data is data representing information representing an urge for any person to assume a predetermined posture. Notification information is, for example, in the form of a text, an image, a sound, a flashing light, or the like, indicative thereof. The notification information output unit 29 outputs the generated notification information data to the notification unit 31.

The notification unit 31 outputs the notification information represented by the notification information data inputted from the notification information output unit 29. The notification unit 31 is configured in accordance with the form of the notification information. For example, in a case where the notification information is in the form of a text or an image, the notification unit 31 includes a display. In a case where the notification information is in the form of a sound, the notification unit 31 includes a loudspeaker. In a case where the notification information is in the form of a flashing light, the notification unit 31 includes a lamp.

(Mobile Unit Control Process)

Next, a mobile unit control process according to the present preferred embodiment will be described.

Figure 17:
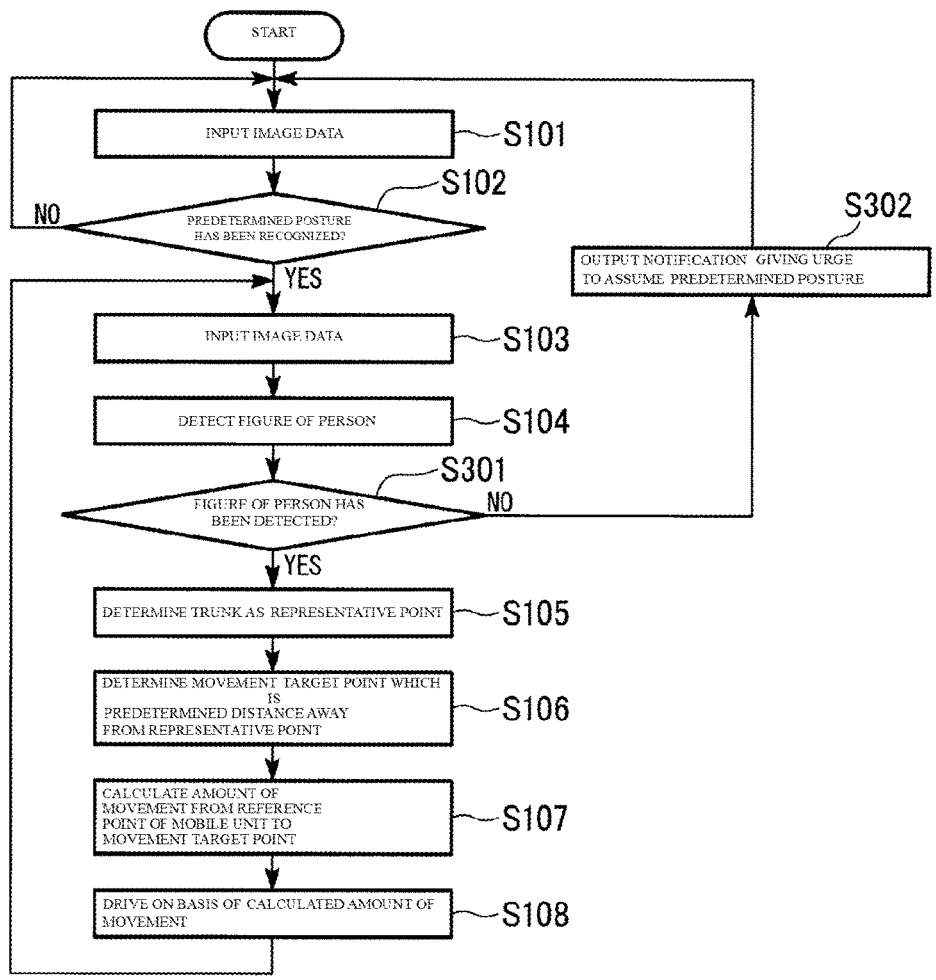
FIG. 17 is a flowchart illustrating a mobile unit control process according to the third preferred embodiment of the present invention.

FIG. 17 is a flowchart illustrating the mobile unit control process according to the present preferred embodiment.

The mobile unit control process according to the present preferred embodiment includes the processes of steps S101-S108 and processes of steps S301 and S302. The processes of steps S101 to S108 are similar to those described above.

After the processes of steps S101-S104 are completed, control proceeds to the process of step S301.

(Step S301) A human body determination unit 23 determines whether a figure of a person has been detected from the image represented by the inputted image data. If the human body determination unit 23 determines that a figure of a person has been detected ("YES" at step S301), control proceeds to the process of step S105. If the human body determination unit 23 determines that a figure of a person has not been detected ("NO" at step S301), control proceeds to the process of step S302.

(Step S302) The notification information output unit 29 generates the notification information data representing the urge to assume the predetermined posture, and outputs the generated notification information data to the notification unit 31. The notification unit 31 outputs the notification information represented by the notification information data inputted from the notification information output unit 29. Thereafter, control returns to step S101.

As described above, in the mobile unit control device 20 according to the present preferred embodiment, the notification information output unit 29 outputs a notification to urge any person to assume the predetermined posture when the representative point identification unit 24 is unable to determine the representative point.

Accordingly, when the representative point identification unit 24 is unable to determine the representative point, information that urges any person to assume the predetermined posture is provided to the person in an area surrounding the mobile unit control device 20. Accordingly, the control of the movement of the mobile unit 1 by the movement control unit 25 can be restarted by the person, provided with the information, assuming the predetermined posture within the field of vision of an imaging unit 11.

While preferred embodiments of the present invention and modifications thereof have been described above with reference to the accompanying drawings, the present invention is not limited to the preferred embodiments and the modifications described above in terms of a specific structure, and various design changes and the like are possible without departing from the scope of the present invention.

For example, the speed v at which the movement control unit 25 causes the mobile unit 1 to move may be increased as the distance d' from the reference point Op to the representative point Oh increases.

Figure 18:
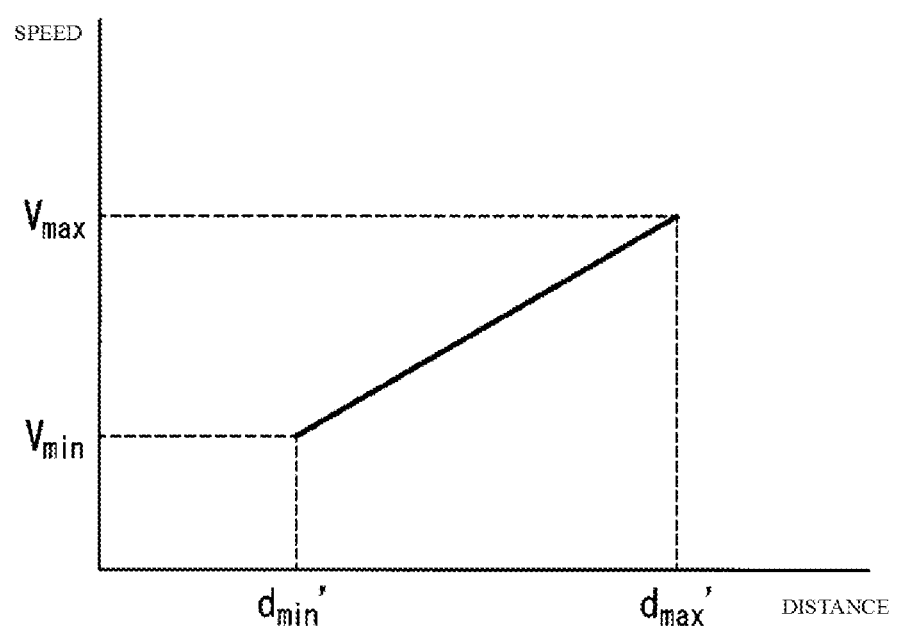
FIG. 18 is a diagram illustrating examples of a target value of a speed in accordance with a distance from a reference point to a representative point.

FIG. 18 is a diagram illustrating examples of a target value of the speed v in accordance with the distance d'. A vertical axis and a horizontal axis represent the target value of the speed v and the distance d', respectively. In the example illustrated in FIG. 18, the target value of the speed v is proportional to the distance d'. The movement control unit 25 generates a drive signal indicating a target value of the speed v which is determined in accordance with the distance d', and outputs the generated drive signal to each of the driving units 13-1 and 13-2. The driving units 13-1 and 13-2 cause the wheels 14-1 and 14-2, respectively, to rotate at rotation speeds proportional to the target value of the speed v indicated by the drive signal inputted from the movement control unit 25.

When the movement control unit 25 increases the speed v at which the mobile unit 1 is caused to move as the distance d' increases as described above, the mobile unit 1 is able to follow the person quickly. When the movement control unit 25 decreases the speed v at which the mobile unit 1 is caused to move as the distance d' decreases, the likelihood that the mobile unit 1 will come into contact with the person is reduced. Note that, in the example illustrated in FIG. 18, the target value of the speed v is defined for a range between a lower limit $d'_{min}$ and an upper limit $d'_{max}$. Here, $d'_{min}$ and $d'_{max}$ are the lower limit and the upper limit, respectively, of the distance d'. They are the lower limit and the upper limit of the distance d'. In addition, $v_{min}$ and $v_{max}$ are a lower limit and an upper limit, respectively, of the target value of the speed v. When the distance d' is smaller than the lower limit $d'_{min}$ or greater than the upper limit $d'_{max}$, the movement control unit 25 sets the target value of the speed v to zero. This is because the representative point identification unit 24 is unable to determine the representative point in this case.

Note that the mobile unit control device 20 according to each of the preferred embodiments and the modifications described above may include an operation input unit in place of the posture recognition unit 26 or in addition to the posture recognition unit 26. Once the operation input unit detects an operation by a person, the mobile unit control device 20 starts the above-described mobile unit control process. The operation input unit may include a button, a mouse, a touch panel, and/or any other pointing device. Accordingly, a person is able to issue an instruction to start the mobile unit control process by performing an operation, without the need to assume the predetermined posture.

Note that the preferred embodiments and the modifications described above may be combined in any appropriate manner. For example, the mobile unit control device 20 according to the second preferred embodiment may include the notification information output unit 29 according to the third preferred embodiment, and be capable of outputting the notification information through the notification unit 31. In this case, the mobile unit control process illustrated in FIG. 10 may include the process of step S302 (FIG. 17). Then, if the representative point identification unit 24 determines at step S203 that the elapsed time has become equal to or greater than the predetermined elapsed time ("YES" at step S203), control may proceed to the process of step S302.

Note that all the functions or some functions of the component units of the mobile unit control device 20 according to each of the above-described preferred embodiments may be realized in the following manner: a program for realizing these functions is recorded on a computer-readable recording medium, and the program recorded on the recording medium is loaded into a computer system and is executed. Note that the term "computer system" as used herein may refer not only to a control device, such as a central processing unit (CPU), but also to an operating system (OS) or hardware, such as a peripheral device.

The term "computer-readable recording medium" refers to a portable medium, such as a flexible disk, a magneto-optical disk, a ROM, or a CD-ROM, or a storage unit, such as a hard disk, contained in the computer system. Further, the term "computer-readable recording medium" may also refer to a medium that dynamically holds the program for a short time, such as a communication line in a case where the program is transmitted through a network, such as the Internet, or a communication channel, such as a telephone line, or to a medium that holds the program for a certain time, such as a volatile memory in a computer system that serves as a server or a client in that case. The above program may be a program for realizing a part of the aforementioned functions, or, further, a program that is used in combination with another program stored in the computer system in advance to realize the aforementioned functions.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A mobile unit control device comprising:
    an imaging unit that, when installed on a mobile unit, captures at least a portion of surroundings of the mobile unit to obtain an image thereof;
    an identification unit that, when the image captured by the imaging unit includes a figure of a person, determines a trunk of the person in the figure of the person as a representative point; and
    a control unit that controls a movement of the mobile unit on a basis of a position of the representative point determined by the identification unit in the image; wherein
    the control unit outputs a control to move the mobile unit backwards when the identification unit does not determine the representative point in the image captured by the imaging unit.

2. The mobile unit control device according to claim 1, wherein
    the identification unit extracts the representative point from each of a plurality of images captured by the imaging unit in sequence; and
    the control unit controls the movement of the mobile unit on a basis of a change over time in the position of the representative point extracted by the identification unit.

3. The mobile unit control device according to claim 1, wherein
    the movement includes a moving direction of the mobile unit; and
    the control unit changes an orientation of the mobile unit when the identification unit is unable to determine the representative point.

4. The mobile unit control device according to claim 1, wherein, if the identification unit determines that the image captured by the imaging unit includes a figure of a person in a predetermined posture, the control unit starts controlling the movement of the mobile unit on the basis of the representative point of this person.

5. The mobile unit control device according to claim 4, wherein the control unit outputs a notification to urge any person to assume the predetermined posture when the identification unit is unable to determine the representative point.

6. The mobile unit control device according to claim 1, wherein the control unit controls the movement of the mobile unit so that a distance between the representative point and a reference point of the mobile unit will be equal to a predetermined distance.

7. A mobile unit, comprising:
    a mobile unit control device, including:
        an imaging unit that, when installed on a mobile unit, captures at least a portion of surroundings of the mobile unit to obtain an image thereof;
        an identification unit that, when the image captured by the imaging unit includes a figure of a person, determines a trunk of the person in the figure of the person as a representative point; and
        a control unit that controls a movement of the mobile unit on a basis of a position of the representative point determined by the identification unit in the image;
    wherein
    the mobile unit is structured to move in an arbitrary direction along a ground; and
    the control unit outputs a control to move the mobile unit backwards when the identification unit does not determine the representative point in the image captured by the imaging unit.

8. The mobile unit according to claim 7, the mobile unit being an automated guided vehicle.

* * * * *